(12) United States Patent
Beales et al.

(10) Patent No.: US 11,614,653 B2
(45) Date of Patent: Mar. 28, 2023

(54) COLOR FILTER ARRAYS FOR TIR-BASED IMAGE DISPLAYS

(71) Applicant: CONCORD (HK) INTERNATIONAL EDUCATION LIMITED, Wan Chai (HK)

(72) Inventors: Graham Beales, Vancouver (CA); Seokjin Han, Cupertino, CA (US); Robert J. Fleming, San Jose, CA (US); Candice Brown Elliot, Santa Rosa, CA (US)

(73) Assignee: CONCORD (HK) INTERNATIONAL EDUCATION LIMITED, Hong Kong (HK)

( * ) Notice: Subject to any disclaimer, the term of this patent is extended or adjusted under 35 U.S.C. 154(b) by 0 days.

(21) Appl. No.: 17/257,473

(22) PCT Filed: Jul. 3, 2019

(86) PCT No.: PCT/US2019/040435
§ 371 (c)(1),
(2) Date: Dec. 31, 2020

(87) PCT Pub. No.: WO2020/010167
PCT Pub. Date: Jan. 9, 2020

(65) Prior Publication Data
US 2021/0132435 A1   May 6, 2021

(51) Int. Cl.
*G09G 3/34* (2006.01)
*G02F 1/1335* (2006.01)
(Continued)

(52) U.S. Cl.
CPC ..... *G02F 1/133514* (2013.01); *G02B 6/0051* (2013.01); *G02F 1/133616* (2021.01);
(Continued)

(58) Field of Classification Search
CPC ............. G02F 1/133514; G02F 1/1685; G02F 1/16766; G02F 1/1677; G02F 1/167; G02F 2203/02; G02B 6/0051; G09G 3/344
See application file for complete search history.

(56) References Cited

U.S. PATENT DOCUMENTS 9,728,588 B2   8/2017 Peng et al.
2012/0262496 A1* 10/2012 Swic ..................... G09G 3/344
345/690

(Continued)

FOREIGN PATENT DOCUMENTS

CN   106898291 A   6/2017
JP   2016161920 A   9/2016

OTHER PUBLICATIONS

European Search Report in Application No. 19830369.5 dated Jun. 20, 2022.
(Continued)

*Primary Examiner* — Ricardo Osorio
(74) *Attorney, Agent, or Firm* — Maschoff Brennan

(57) ABSTRACT

Color may be achieved in TIR-based image displays by addition of a sub-pixel color filter array (CFA). Color may be enhanced by tuning the size, shape, arrangement and colors of the sub-pixel color filters in the CFA. CFAs comprising of pixels further comprising one to four or more different repeating sub-pixel color filters may be capable of creating a wide gamut of displayable colors. The sub-pixels may be arranged in repeat cells wherein the sub-pixels within the repeat cell may be mapped to one or more pixels. Sub-pixel rendering may be used during driving of a TIR-based display. Sub-pixel rendering uses logical dynamic pixels where a single sub-pixel may be used in one or more pixels depending on the image displayed.

23 Claims, 12 Drawing Sheets

(51) Int. Cl.
*G02F 1/1685* (2019.01)
*G02F 1/16766* (2019.01)
*G02F 1/1677* (2019.01)
*F21V 8/00* (2006.01)
*G02F 1/167* (2019.01)

(52) U.S. Cl.
CPC ............ *G02F 1/167* (2013.01); *G02F 1/1677* (2019.01); *G02F 1/1685* (2019.01); *G02F 1/16766* (2019.01); *G09G 3/344* (2013.01); *G02F 2203/02* (2013.01)

(56) References Cited

U.S. PATENT DOCUMENTS

| | | | | |
|---|---|---|---|---|
| 2016/0147128 A1* | 5/2016 | Loxley | .................. | G09G 3/344 359/222.1 |
| 2016/0231475 A1* | 8/2016 | Whitehead | .............. | G02F 1/167 |
| 2016/0260401 A1 | 9/2016 | Sakaigawa | | |
| 2016/0274435 A1* | 9/2016 | Whitehead | .............. | G02F 1/167 |
| 2016/0335948 A1 | 11/2016 | Wen et al. | | |
| 2016/0349592 A1* | 12/2016 | Goulding | .............. | G02F 1/0123 |
| 2017/0076653 A1 | 3/2017 | Bell et al. | | |
| 2017/0299935 A1* | 10/2017 | Whitehead | .......... | G02B 26/026 |
| 2018/0031941 A1* | 2/2018 | Goulding | ................ | G02F 1/167 |
| 2018/0088435 A1* | 3/2018 | Liang | .................... | G02F 1/1677 |
| 2018/0130401 A1 | 5/2018 | Xiang et al. | | |
| 2018/0157144 A1* | 6/2018 | Sadlik | ................. | G02F 1/13306 |
| 2018/0173074 A1* | 6/2018 | Zhang | ................ | G02F 1/13394 |
| 2019/0107765 A1* | 4/2019 | Whitehead | .............. | G02F 1/315 |
| 2020/0119105 A1* | 4/2020 | Park | ...................... | H01L 27/156 |
| 2020/0135085 A1 | 4/2020 | Tian | | |

OTHER PUBLICATIONS

JP Office Action in Application No. 2020-573134 dated Jan. 17, 2023.

* cited by examiner

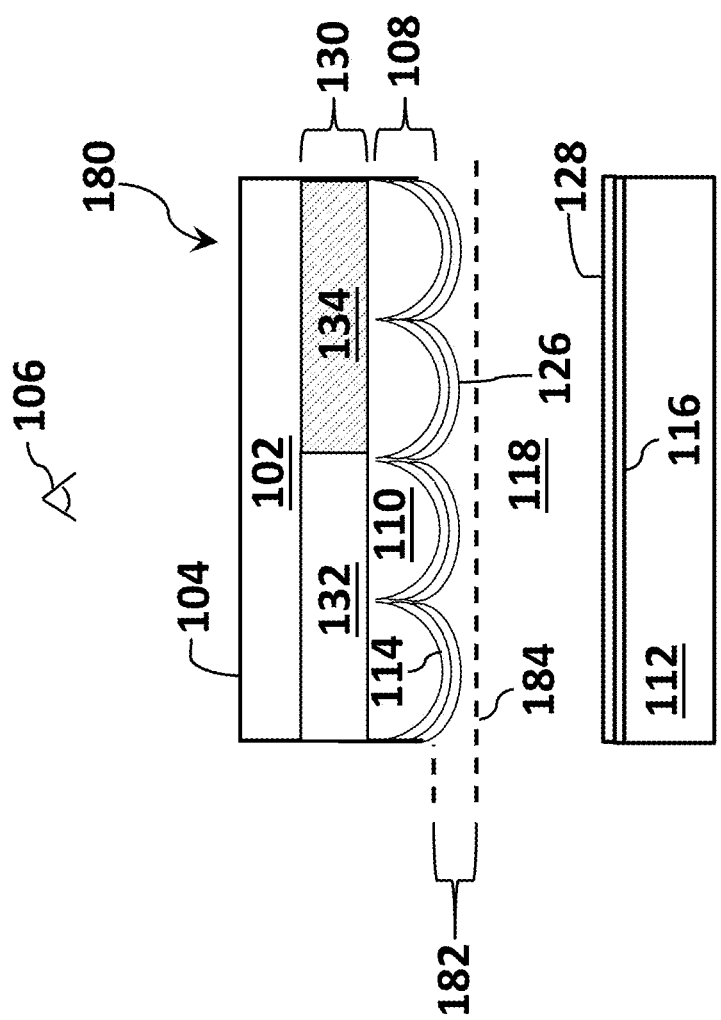

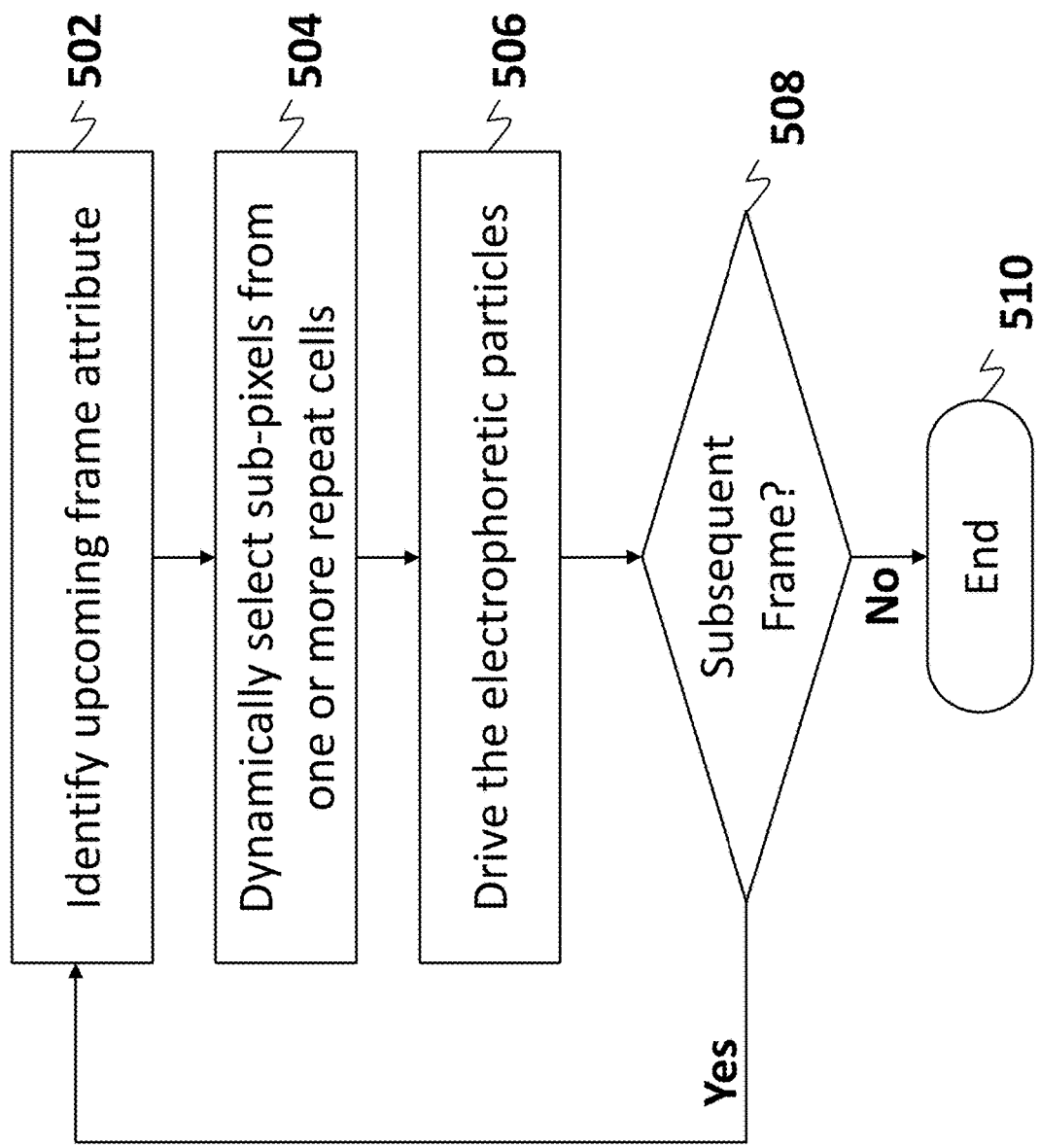

COLOR FILTER ARRAYS FOR TIR-BASED IMAGE DISPLAYS

This application claims the filing date benefit of PCT Application No. PCT/US2019/040435, filed on Jul. 3, 2019 and U.S. Provisional Application No. 62/693,449, filed on Jul. 3, 2018, the entirety of which is incorporated herein by reference.

FIELD

The disclosed embodiments generally relate to reflective image displays. In one embodiment, the disclosure relates to a totally internally reflective (TIR) image display comprising of a plurality of shape dependent convex protrusions and a color filter array (CFA).

BACKGROUND

Prior art total internal reflection (TIR) based displays include, among others, a transparent high refractive index front sheet in contact with a low refractive index fluid. The front sheet and fluid may have different refractive indices that may be characterized by a critical angle $\theta_c$. The critical angle characterizes the interface between the surface of the transparent front sheet (with refractive index $\eta_1$) and the low refractive index fluid (with refractive index $\eta_3$). Light rays incident upon the interface at angles less than $\theta_c$ may be transmitted through the interface. Light rays incident upon the interface at angles greater than $\theta_c$ may undergo TIR at the interface. A small critical angle (e.g., less than about 50°) is preferred at the TIR interface since this affords a large range of angles over which TIR may occur. It may be prudent to have a fluid medium with preferably as small a refractive index ($\eta_3$) as possible and to have a transparent front sheet composed of a material having a refractive index ($\eta_1$) preferably as large as possible. The critical angle, $\theta_c$, is calculated by the following equation (Eq. 1):

$$\theta_c = \sin^{-1}\left(\frac{\eta_3}{\eta_1}\right) \quad (1)$$

Prior art TIR-based reflective image displays further include electrophoretically mobile, light absorbing particles. The electrophoretically mobile particles move in response to a bias between two opposing electrodes. When particles are moved by a voltage bias source towards the surface of the front sheet they may enter the evanescent wave region (depth of up to about 1 micron) and frustrate TIR. The evanescent wave region depth may vary due to such variables as the wavelength of the incident light, the angle of the incident light and the refractive indices of the front sheet and the medium. Incident light may be absorbed by the electrophoretically mobile particles to create a dark, grey or colored state observed by the viewer. The states may be dependent on the number of particles and their location within the evanescent wave region. The dark or colored state may be the color of the particles. Under such conditions, the display surface may appear dark or black to the viewer. When the particles are moved away from and out of the evanescent wave region (e.g., by reverse biasing), light may be reflected by TIR. This creates a white, bright, colored or grey state that may be observed by the viewer. The bright or colored state may be the color of incident light or a color filter. An array of pixelated electrodes may be used to drive the particles into and out of the evanescent wave region at individual pixels to form combinations of white, black and colored states, such as near the surface of a color filter. The combinations of white, black and colored states may be used to create images or to convey information to the viewer.

The front sheet in prior art TIR-based displays typically includes a plurality of higher refractive index close-packed convex structures on the inward side facing the lower refractive index medium and electrophoretically mobile particles (i.e., the surface of the front sheet which faces away from the viewer). The convex structures may be hemispherically-shaped but other shapes may be used. A prior art TIR-based display 100 is illustrated in FIG. 1A. Display 100 is shown with a transparent front sheet 102 with outer surface 104 facing viewer 106. Display 100 further comprising a layer of a plurality 108 of convex protrusions 110, rear support sheet 112, transparent front electrode 114 on the surface of the plurality 108 of individual convex protrusions 110 and rear electrode 116. Rear electrode 116 may comprise a passive matrix array of electrodes, a thin film transistor (TFT) array or a direct drive array of electrodes. The rear array of electrodes may be formed in an array of pixels wherein each pixel may be driven by a TFT. FIG. 1A also shows low refractive index fluid 118 which is disposed within the cavity or gap 120 formed between the surface of protrusions 108 and rear support sheet 112. Fluid 118 contains a plurality of light absorbing electrophoretically mobile particles 122. Display 100 further includes a voltage bias source 124 capable of creating a bias across cavity 120. Display 100 may further comprise one or more dielectric layers 126, 128 on front electrode 114 or rear electrode 116 or on both the front and rear electrodes, and a color filter layer 130. Adding a color filter array (CFA) layer over the front surface of the display is a method to transform a black and white reflective display into a full color display.

A conventional color filter layer typically comprises one or more sub-pixel color filters. Sub-pixel color filters may comprise one or more colors of red, green, blue, white, black, clear, cyan, magenta or yellow. The sub-pixel color filters are typically grouped into two or more colors and arrayed in a repeatable pattern. The repeatable pattern makes up a pixel such as, for example, RGB (red-green-blue) sub-pixels or RGBW (red-green-blue-white) sub-pixels in conventional displays. For illustrative purposes, a portion of prior art display 100 in FIG. 1A comprises color filter layer 130, further comprising a red sub-pixel color filter 132, a green sub-pixel color filter 134 and a blue sub-pixel color filter 136. Other sub-pixel color filter combinations may be used.

When particles 122 are electrophoretically moved towards front electrode 114 and into the evanescent wave region, they may frustrate TIR. This is shown to the right of dotted line 138 and is illustrated by incident light rays 140 and 142 being absorbed by particles 122. This area of the display, such as at a pixel, may appear as a dark, colored or grey state to viewer 106.

When particles are moved away from front sheet 102 and out of the evanescent wave region towards rear electrode 116 (as shown to the left of dotted line 138) incident light rays may be totally internally reflected at the interface of the surface of dielectric layer 126 on convex protrusion array 108 and medium 118. This is represented by incident light ray 144, which is totally internally reflected and exits the display towards viewer 106 as reflected light ray 146. The display pixel may appear white, bright, colored or grey to the viewer.

Prior art TIR-based display 100 may further comprise sidewalls 148 that bridge front sheet 102 to rear sheet 112. Sidewalls may comprise at least one dielectric layer 150. Display 100 may further comprise a directional front light system 152. Front light system 152 may comprise light source 154 and waveguide 156.

FIG. 1B schematically illustrates a cross-section of a portion of a prior art TIR-based display showing the approximate location of the evanescent wave region. Drawing 180 in FIG. 1B is a close-up view of a portion of drawing 100 in FIG. 1A. The evanescent wave region is located at the interface of dielectric layer 126 and medium 118. This location is illustrated in drawing 180, wherein the evanescent wave region 182 is located between dotted line 184 and dielectric layer 126. The evanescent wave is typically conformal to the surface of layer of protrusions 108. The depth of the evanescent wave region is about 1 micron, as previously mentioned.

FIG. 1C schematically illustrates a plan view of a sheet of convex protrusions. The view in FIG. 1C looks down on surface 104 of sheet 102. This is the view of viewer 106 in FIGS. 1A-B. Convex protrusions 110 are arranged in a layer 108 on the opposite side of sheet 102 and are depicted as dotted line circles representing hemispheres arranged into a close packed array. Other arrangements of convex protrusions 110 may be possible. Protrusions 110 may be arranged in non-close packed rows.

BRIEF DESCRIPTION OF DRAWINGS

These and other embodiments of the disclosure will be discussed with reference to the following exemplary and non-limiting illustrations, in which like elements are numbered similarly, and where:

FIG. 1B schematically illustrates a cross-section of a portion of a prior art TIR-based display showing the approximate location of the evanescent wave region;

FIG. 5 is a flow diagram for implementing an embodiment of the disclosure on a totally-internally reflective image display.

DETAILED DESCRIPTION

Figure 1A:
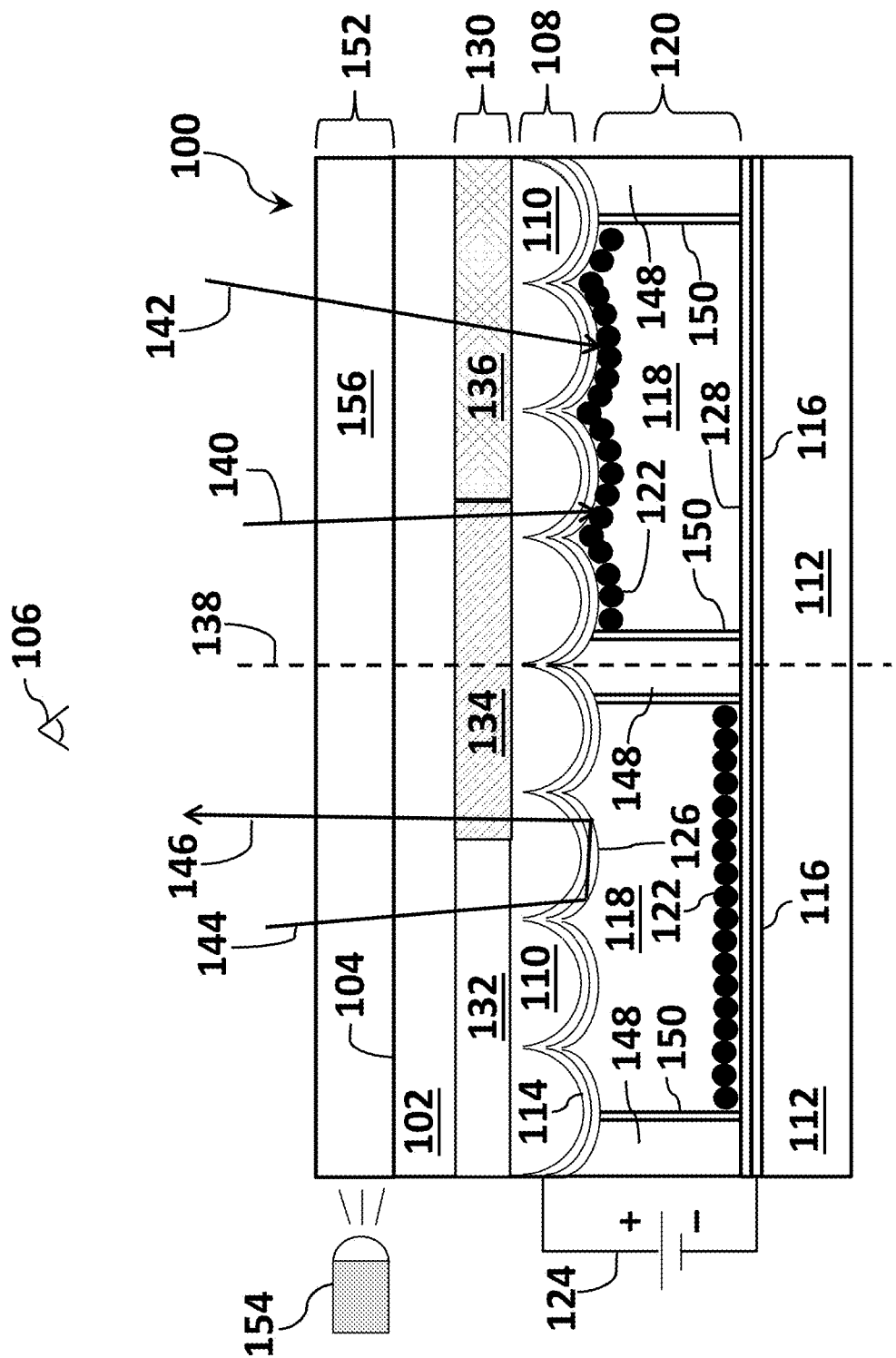
FIG. 1A schematically illustrates a cross-section of a portion of a prior art TIR-based display.

Throughout the following description specific details are set forth in order to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive sense.

Conventional color filter arrays typically include combinations of sub-pixels of different colors in regular pixel arrays. Each pixel is made up of several sub-pixels wherein each sub-pixel is 1:1 mapped to a pixel. It is critical to optimize the CFA for reflective displays as the amount of reflected light is limited when compared to a back lit display. One method to do this is with sub-pixel rendering. Sub-pixel rendering uses sub-pixels in repeatable patterns. The repeatable patterns are referred to as repeat cells that are not necessarily mapped in a 1:1 manner with a single pixel. Sub-pixels may be mapped with multiple pixels in a dynamic way depending on the image displayed. These pixels are referred to as logical pixels in sub-pixel rendering.

In certain embodiments, the disclosure provides methods to optimize the color gamut and brightness of a full-color TIR-based reflective display by tuning the CFA. The CFA may be tuned on a sub-pixel-by-sub-pixel basis. This may be done by changing the size, shape and color points of the color filter sub-pixels. In an exemplary embodiment, a CFA may comprise one or more sub-pixels that are 1:1 mapped to a pixel. In other embodiments, the one or more sub-pixels may be mapped dynamically to multiple pixels in sub-pixel rendering to form logical pixels. The mapping may be implemented during display driving. As used herein, the term "logical pixels" may be used where pixels are formed from adjacent sub-pixels of one or more repeat cells. Thus, sub-pixel rendering, as used herein, refers to selection of one or more sub-pixels from nearby repeat cells to form a pixel to be displayed as an image (i.e., an image pixel). In an exemplary embodiment, a TIR-based reflective image display may be driven using sub-pixel rendering. The sub-pixels form repeat cells in repeatable patterns that are arrayed throughout the CFA. By using multiple sub-pixels from adjacent repeat cells to form desired colors and images, fewer and less complex electronics may be needed to drive the display. This leads to cheaper and lower power displays. Cost, energy efficiency and ease of manufacturing are among advantages of the disclosed embodiments.

As stated, a repeat cell is a group of sub-pixels. A repeat cell may include sub-pixel color filters of red (R), green (G), and blue (B) or other colors. To distinguish sub-pixels of the same color, subscripts are used. Thus, $R_1$ and $R_2$ are sub-pixels that may be the same red color or different hues of red. In an exemplary embodiment, a sub-pixel repeat cell may comprise $RG_1BG_2$ sub-pixels wherein $G_1$ and $G_2$ are green-based sub-pixels with identical or different hues. In an exemplary embodiment, a first sub-pixel may have different dimensions than a second, third or fourth sub-pixel within the same sub-pixel repeat cell. In another embodiment, the sub-pixels may have substantially the same dimensions. In some embodiments, a mask may surround at least one sub-pixel in a sub-pixel repeat cell. In other embodiments, there may be no mask between sub-pixels such that the sub-pixel color filters are immediately adjacent and touch each other. In still other embodiments, there may be a mask around one or more sides of the sub-pixel repeat cells. In still other embodiments, there may be no mask within a pixel array such that the sub-pixel color filters within a sub-pixel repeat cell may touch sub-pixel color filters of adjacent repeat cells. In still other embodiments, the sub-pixel repeat cells may be arranged in a checkerboard fashion. In still other embodiments, the sub-pixels may be offset with an adjacent sub-pixel by the width of at least one sub-pixel within a repeat cell.

Figure 2A:
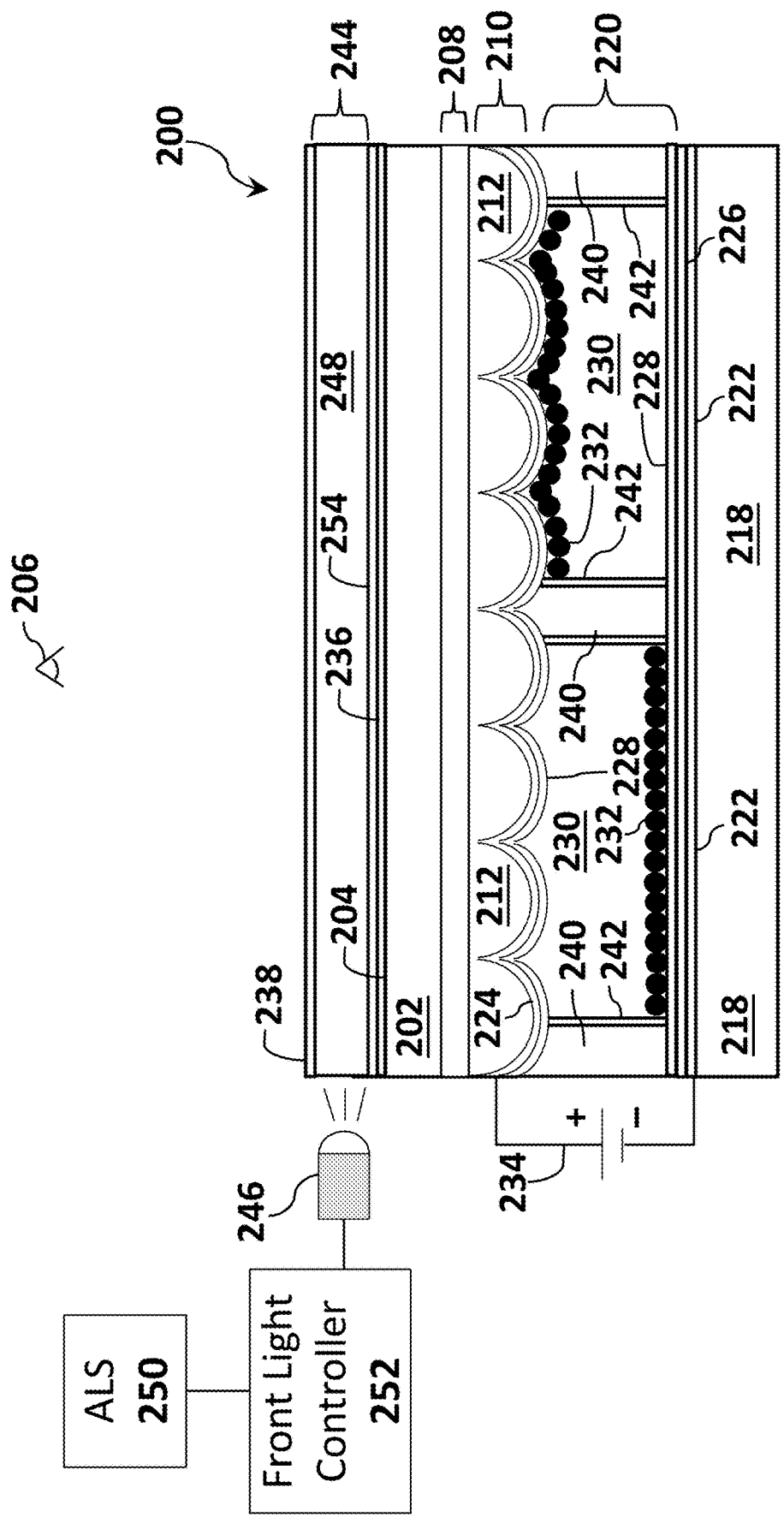
FIG. 2A schematically illustrates a cross-section of a portion of a front sheet of a TIR-based display according to one embodiment of the disclosure.

FIG. 2A schematically illustrates a cross-section of a portion of a front sheet of a TIR-based display according to one embodiment of the disclosure. Display embodiment 200 is similar to prior art display 100 but uses dynamic sub-pixel rendering according to the disclosed principles. Display embodiment 200 comprises transparent front sheet 202 with outer surface 204 facing viewer 206. In an exemplary embodiment, sheet 202 may comprise a flexible glass. In an exemplary embodiment, sheet 202 may comprise glass of thickness in the range of about 20-250 (micron) ▢m. Sheet 202 may comprise a flexible glass such as SCHOTT AF 32® eco or D 263® T eco ultra-thin glass. Sheet 202 may comprise a polymer such as polycarbonate. In an exemplary embodiment, sheet 202 may comprise a flexible polymer.

Embodiment 200 includes color filter array layer 208, located between front sheet 202 and an inward array layer 210 of convex protrusions 212. In some embodiments, color filter array layer 208 may be located on the outer surface 204 of sheet 202 facing viewer 206.

Color filter layer 208 may include one or more of red, green, blue, black, clear, white (W), cyan, magenta or yellow sub-pixel color filters. In an exemplary embodiment, color filter layer 208 may comprise at least one sub-pixel color filter comprising any color point within the International Commission on Illumination (CIE) 1931 color space. Color filter layer 208 may comprise one or more of black, white or transparent masks or borders around one or more color filter sub-pixels or groups of color filter sub-pixels within a sub-pixel repeat cell. In an exemplary embodiment, color filter array layer 208 may comprise a PenTile™ array of sub-pixel color filter repeat cells. Color filter array layer 208 may comprise one or both of PenTile™ RGBG (also known as Takahashi) array of sub-pixel repeat cells or PenTile™ RGBW array of sub-pixel repeat cells.

Conventional color filters are formed from a set number of sub-pixel color filters (typically 3 or 4) grouped into pixels where each sub-pixel is typically mapped to one pixel during driving. The pixel, comprising the sub-pixels, is the repeated pattern throughout the CFA. In sub-pixel rendering, there are also sub-pixel repeat patterns. However, because the sub-pixels are selected dynamically prior to forming the pixels to make up an image, each sub-pixel may not be mapped to a single pixel as in conventional CFAs. The difference, according to the disclosed principles, is that during sub-pixel rendering, each sub-pixel within a repeat cell could be mapped to up to ten pixels during display driving in a dynamic manner. That is, the same sub-pixels may be assigned to one or more pixels during a first image drive and to one or more pixels during a second image drive. These are termed as logical pixels. Logical pixels used shared and overlapped sub-pixels. Logical pixels are dynamic, not fixed. For example, two logical pixels centered on the same green subpixels may also share red and blue sub-pixels of adjacent and different repeat cells depending on the image to be rendered. This allows rendering images with fill luminance resolution using only two sub-pixels per logical pixel on average. This allows for fewer drive electronics which reduces the cost of the display and reduces the power consumption by the display. Thus, throughout this disclosure, the term "sub-pixel repeat cell" will be used to describe the various novel sub-pixel arrangements that may be used in combination with a TIR-based image display.

Figure 2B:
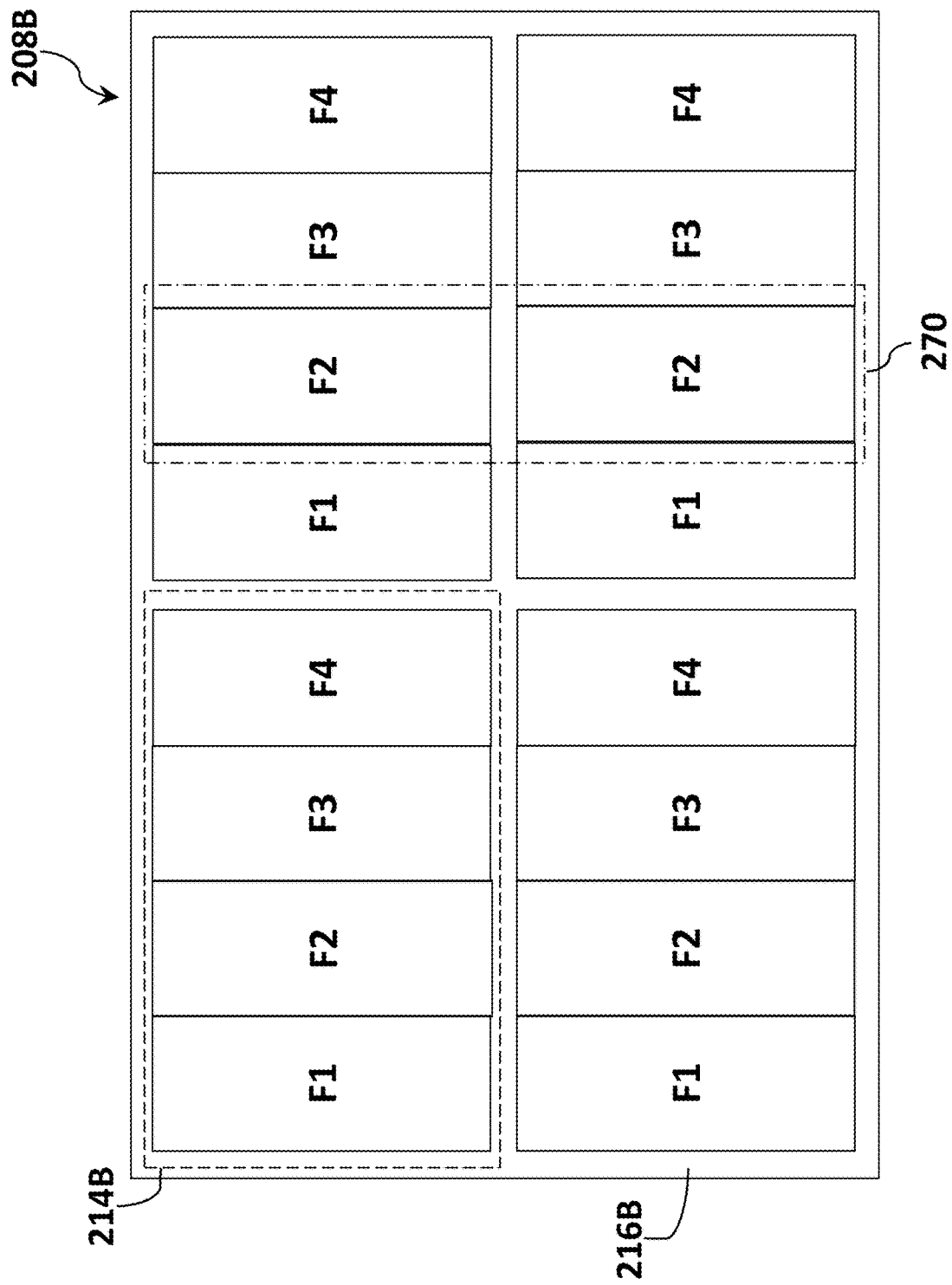
FIG. 2B schematically illustrates a sub-pixel repeat cell array design embodiment for use in a TIR-based display according to one embodiment of the disclosure.

FIG. 2B schematically illustrates a sub-pixel repeat cell array design embodiment for use in a TIR-based display according to one embodiment of the disclosure. In an exemplary embodiment, layer 208 may comprise sub-pixel repeat cell array 208B in display 200. CFA embodiment 208B illustrates an array of four sub-pixel repeat cells 214B. For simplicity, only one sub-pixel repeat cell array is identified with broken line 214B. Each sub-pixel array repeat cell 214B further comprises four sub-pixels denoted F1, F2, F3 and F4 (i.e., sub-pixel filter 1, 2, 3 or 4).

In an exemplary embodiment, CFA layer 208 comprises a repeating array of sub-pixel repeat cells 214B. In one embodiment, repeating sub-pixel repeat cell 214 B (shown by a broken line box) is the basic repeating unit in array 208B. Repeating sub-pixel repeat cell 214B may be aligned with respect to other repeat cells such that the sub-pixel color filters are arranged in lines to form columns of F1 sub-pixels, columns of F2 sub-pixels, columns of F3 sub-pixels and columns of F4 sub-pixels. A column of F2 sub-pixels is highlighted by broken line box 270 in FIG. 2B. Though four sub-pixel color filters are shown in each sub-pixel repeat cell 214B, each sub-pixel repeat cell 214B may comprise one to four color filter sub-pixels. Fewer or more sub-pixels (and optionally filter) may be included in a repeat cell without departing from the disclosed principles. In some embodiments, CFA array 208B may comprise an optional border or mask 216B.

In some embodiments, CFA array 208B may not comprise a border or mask 216B such that the edges of sub-pixels F1, F2, F3 and F4 are substantially abutting (touching) to form a continuous array. Mask 216B may be one or more of white, black or clear. In an exemplary embodiment, each sub-pixel in CFA 208B may be substantially aligned with a TFT. Table 1 illustrates possible CFA 208B sub-pixel color filters/masks embodiments:

TABLE 1

An Example of Sub-Pixel Repeat Cell Arrangements in CFA Embodiment 208B.

| Repeat Cell # | Sub-Pixel Color Filters | | | | Mask |
|---|---|---|---|---|---|
| | F1 | F2 | F3 | F4 | |
| 1 | Red | Green | Blue | Green | None |
| 2 | Red | Green | Blue | Green | White |
| 3 | Red | Green | Blue | Green | Black |
| 4 | Red | Green | Blue | Green | Clear |
| 5 | Red | Green | Blue | Yellow | None |
| 6 | Red | Green | Blue | Yellow | White |
| 7 | Red | Green | Blue | Yellow | Black |
| 8 | Red | Green | Blue | Yellow | Clear |
| 9 | Red | Green | Blue | White | None |
| 10 | Red | Green | Blue | White | White |
| 11 | Red | Green | Blue | White | Black |
| 12 | Red | Green | Blue | White | Clear |
| 13 | Red | Green-Blue | Blue | Green-Yellow | None |
| 14 | Red | Green-Blue | Blue | Green-Yellow | White |
| 15 | Red | Green-Blue | Blue | Green-Yellow | Black |
| 16 | Red | Green-Blue | Blue | Green-Yellow | Clear |

In some embodiments, CFA 208B may comprise one or more of a black, white or clear mask around one or more sub-pixel color filters. In an exemplary, embodiment, F2 and F4 (FIG. 2B) may be different coordinates of green within the CIE 1931 chromaticity diagram. For example, in designs 13-16 in Table 1, F2 may be a green-blue whereas F4 may be a green-yellow. When combined they can form a true green color but separately may be able to form a better or truer yellow and indigo color when compared to when F2 and F4 are both a true green color.

Figure 2C:
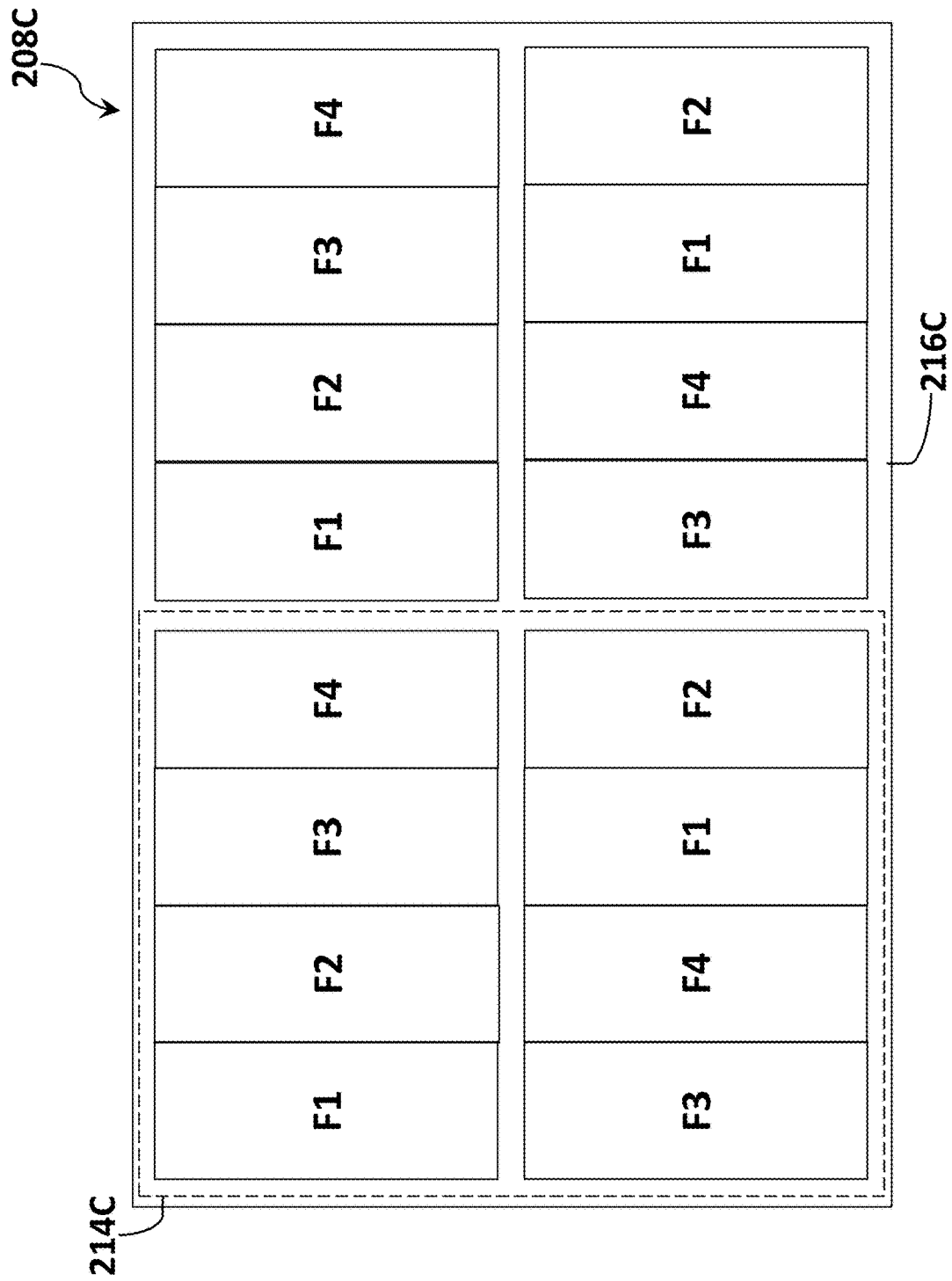
FIG. 2C schematically illustrates a sub-pixel repeat cell array design embodiment for use in a TIR-based display according to another embodiment of the disclosure.

FIG. 2C schematically illustrates a sub-pixel repeat cell array design embodiment for use in a TIR-based display according to another embodiment of the disclosure. In an exemplary embodiment, layer 208 may comprise CFA design 208C in display 200. CFA embodiment 208C illustrates sub-pixel repeat cell 214C further comprising at least one sub-pixel color filter in each repeat cell 214C.

In an exemplary embodiment, each sub-pixel repeat cell 214C comprises four sub-pixels. Though four sub-pixel color filters are shown in repeat cell 214C (denoted by a broken line box), each repeat cell 214C may comprise one to four color filter sub-pixels. The sub-pixel repeat cell highlighted by a broken line box is the basic repeating unit in color filter array embodiment 208C. Sub-pixel color filters are denoted F1, F2, F3 and F4 (i.e., sub-pixel filter 1, 2, 3 or 4). Repeat cells 214C are aligned such that the sub-pixel color filters of the same color are not in a column as in FIG. 2B. In the embodiment 208C in FIG. 2C, each sub-pixel of a first color is offset by two places by an adjacent sub-pixel of the same color. In FIG. 2C, an F1 sub-pixel is aligned with an F3 sub-pixel of an adjacent pixel. In other embodiments, an F1 sub-pixel may be aligned with an adjacent F1, F2, F3 or F4 sub-pixel. The sub-pixels in embodiment 208C may be arranged in a checkerboard pattern.

In some embodiments, CFA embodiment 208C may comprise an optional border or mask 216C. In some embodiments, CFA embodiment 208C may not comprise an optional border or mask 216C such that the edges of sub-pixel color filters F1, F2, F3 and F4 are substantially touching to form a contiguous display array. Mask 216C may be one or more of white, black or clear. In an exemplary embodiment, each sub-pixel in CFA 208C may be substantially aligned with a TFT.

TABLE 2

An Example of Sub-Pixel Color Filter Arrangements in CFA Embodiment 208C.

| Repeat Cell # | F1 | F2 | F3 | F4 | Mask |
|---|---|---|---|---|---|
| 17 | Red | Green | Blue | Green | None |
| 18 | Red | Green | Blue | Green | White |
| 19 | Red | Green | Blue | Green | Black |
| 20 | Red | Green | Blue | Green | Clear |
| 21 | Red | Green | Blue | Yellow | None |
| 22 | Red | Green | Blue | Yellow | White |
| 23 | Red | Green | Blue | Yellow | Black |
| 24 | Red | Green | Blue | Yellow | Clear |
| 25 | Red | Green | Blue | White | None |
| 26 | Red | Green | Blue | White | White |
| 27 | Red | Green | Blue | White | Black |
| 28 | Red | Green | Blue | White | Clear |
| 29 | Red | Green-Blue | Blue | Green-Yellow | None |
| 30 | Red | Green-Blue | Blue | Green-Yellow | White |
| 31 | Red | Green-Blue | Blue | Green-Yellow | Black |
| 32 | Red | Green-Blue | Blue | Green-Yellow | Clear |

In some embodiments, CFA 208C may comprise one or more of a black, white or clear mask around one or more sub-pixel color filters. It should be noted that in some embodiments, F2 and F4 may be different coordinates of green within the CIE 1931 chromaticity diagram. For example, in designs 29-32 in Table 2, F2 may be a green-blue whereas F4 may be a green-yellow. When combined they may form a true green color but separately may be able to form a better or truer yellow and indigo color when compared to when F2 and F4 are both a true green color.

Figure 2D:
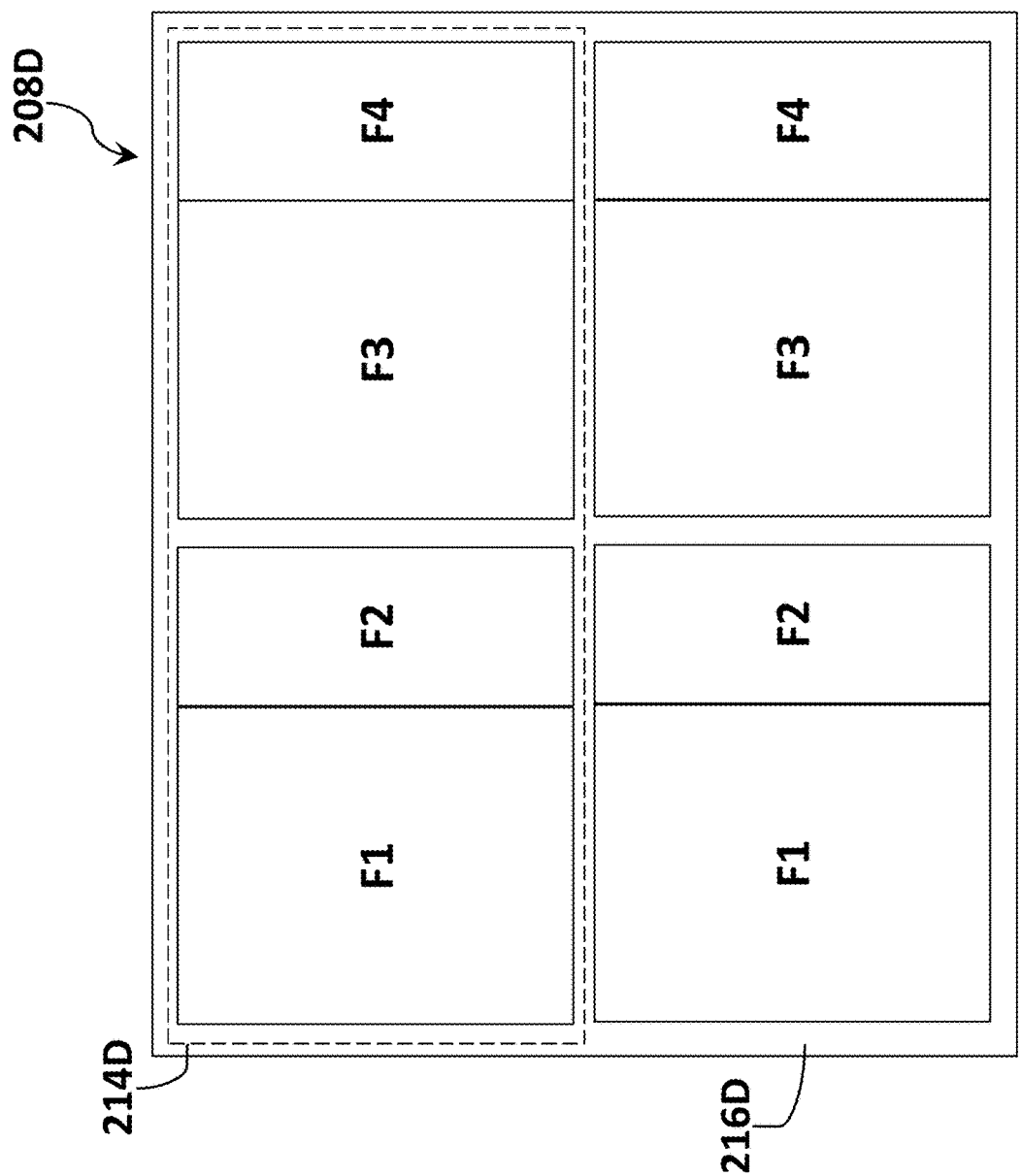
FIG. 2D schematically illustrates a sub-pixel repeat cell array design embodiment for use in a TIR-based display according to another embodiment of the disclosure.

FIG. 2D schematically illustrates a sub-pixel repeat cell array design embodiment for use in a TIR-based display according to another embodiment of the disclosure. In an exemplary embodiment, layer 208 may comprise CFA design 208D in display 200. CFA embodiment 208D illustrates an array of two sub-pixel repeat cells 214D each further comprising four sub-pixel color filters. Sub-pixel color filters are denoted F1, F2, F3 and F4 (i.e., sub-pixel filter 1, 2, 3 or 4). Repeat cells 214D are aligned such that the sub-pixel color filters are arranged in a lined pattern such as in 208B. This is illustrated in FIG. 2D where an F1 sub-pixel in one pixel is aligned with another F1 sub-pixel in an adjacent repeat cell above or below. Though four sub-pixel color filters are shown in each repeat cell 214D (denoted by a dotted line), each repeat cell 214D may comprise one to four (or more) color filter sub-pixels. The sub-pixels highlighted by broken line 214D is the basic repeat unit (i.e., sub-pixel repeat cell) of color filter array design embodiment 208D. In an exemplary embodiment, the sub-pixels (with optional color filters) F1-F4 may comprise different dimensions (i.e., height, width). In FIG. 2D, F1 is approximately twice the width as F2, and F3 is approximately twice the width of F4. In an exemplary embodiment, at least one sub-pixel is larger than another sub-pixel within the same repeat cell. In the illustrative embodiment of FIG. 2C, all sub-pixels were substantially the same size. The dimensions of the sub-pixel color filters may be of any size relative to the adjacent sub-pixel color filters. In some embodiments, CFA array 208D may comprise an optional border or mask 216D. In some embodiments, CFA array 208D may not comprise an optional border or mask 216D such that the edges of sub-pixel color filters F1, F2, F3 and F4 are substantially touching to form a continuous array. Mask 216D may be one or more of white, black or clear. In an exemplary embodiment, each color filter sub-pixel in CFA 208D may be substantially aligned with a TFT.

TABLE 3

An Example of Sub-Pixel Color Filter
Arrangements in CFA Embodiment 208D.

| Repeat Cell # | Sub-Pixel Color Filters | | | | Mask |
|---|---|---|---|---|---|
| | F1 | F2 | F3 | F4 | |
| 33 | Red | Green | Blue | Green | None |
| 34 | Red | Green | Blue | Green | White |
| 35 | Red | Green | Blue | Green | Black |
| 36 | Red | Green | Blue | Green | Clear |
| 37 | Red | Green | Blue | Yellow | None |
| 38 | Red | Green | Blue | Yellow | White |
| 39 | Red | Green | Blue | Yellow | Black |
| 40 | Red | Green | Blue | Yellow | Clear |
| 41 | Red | Green | Blue | White | None |
| 42 | Red | Green | Blue | White | White |
| 43 | Red | Green | Blue | White | Black |
| 44 | Red | Green | Blue | White | Clear |
| 45 | Red | Green-Blue | Blue | Green-Yellow | None |
| 46 | Red | Green-Blue | Blue | Green-Yellow | White |
| 47 | Red | Green-Blue | Blue | Green-Yellow | Black |
| 48 | Red | Green-Blue | Blue | Green-Yellow | Clear |

TABLE 4

An Example of Sub-Pixel Color Filter
Arrangements in CFA Embodiment 208E.

| Repeat Cell # | Sub-Pixel Color Filters | | | | Mask |
|---|---|---|---|---|---|
| | F1 | F2 | F3 | F4 | |
| 49 | Red | Green | Blue | Green | None |
| 50 | Red | Green | Blue | Green | White |
| 51 | Red | Green | Blue | Green | Black |
| 52 | Red | Green | Blue | Green | Clear |
| 53 | Red | Green | Blue | Yellow | None |
| 54 | Red | Green | Blue | Yellow | White |
| 55 | Red | Green | Blue | Yellow | Black |
| 56 | Red | Green | Blue | Yellow | Clear |
| 57 | Red | Green | Blue | White | None |
| 58 | Red | Green | Blue | White | White |
| 59 | Red | Green | Blue | White | Black |
| 60 | Red | Green | Blue | White | Clear |
| 61 | Red | Green-Blue | Blue | Green-Yellow | None |
| 62 | Red | Green-Blue | Blue | Green-Yellow | White |
| 63 | Red | Green-Blue | Blue | Green-Yellow | Black |
| 64 | Red | Green-Blue | Blue | Green-Yellow | Clear |

In some embodiments, CFA embodiment 208D may comprise one or more of a black, white or clear mask around one or more sub-pixel color filters. It should be noted that in some embodiments, F2 and F4 may be different coordinates of green within the CIE 1931 chromaticity diagram. For example, in design embodiments 45-48 in Table 3, F2 may be a green-blue whereas F4 may be a green-yellow. When combined they may form a true green color but separately may be able to form a better or truer yellow or indigo colors when compared to when F2 and F4 are both a true green color. In some embodiments, sub-pixels F1 and F3 may be substantially the same green color.

Figure 2E:
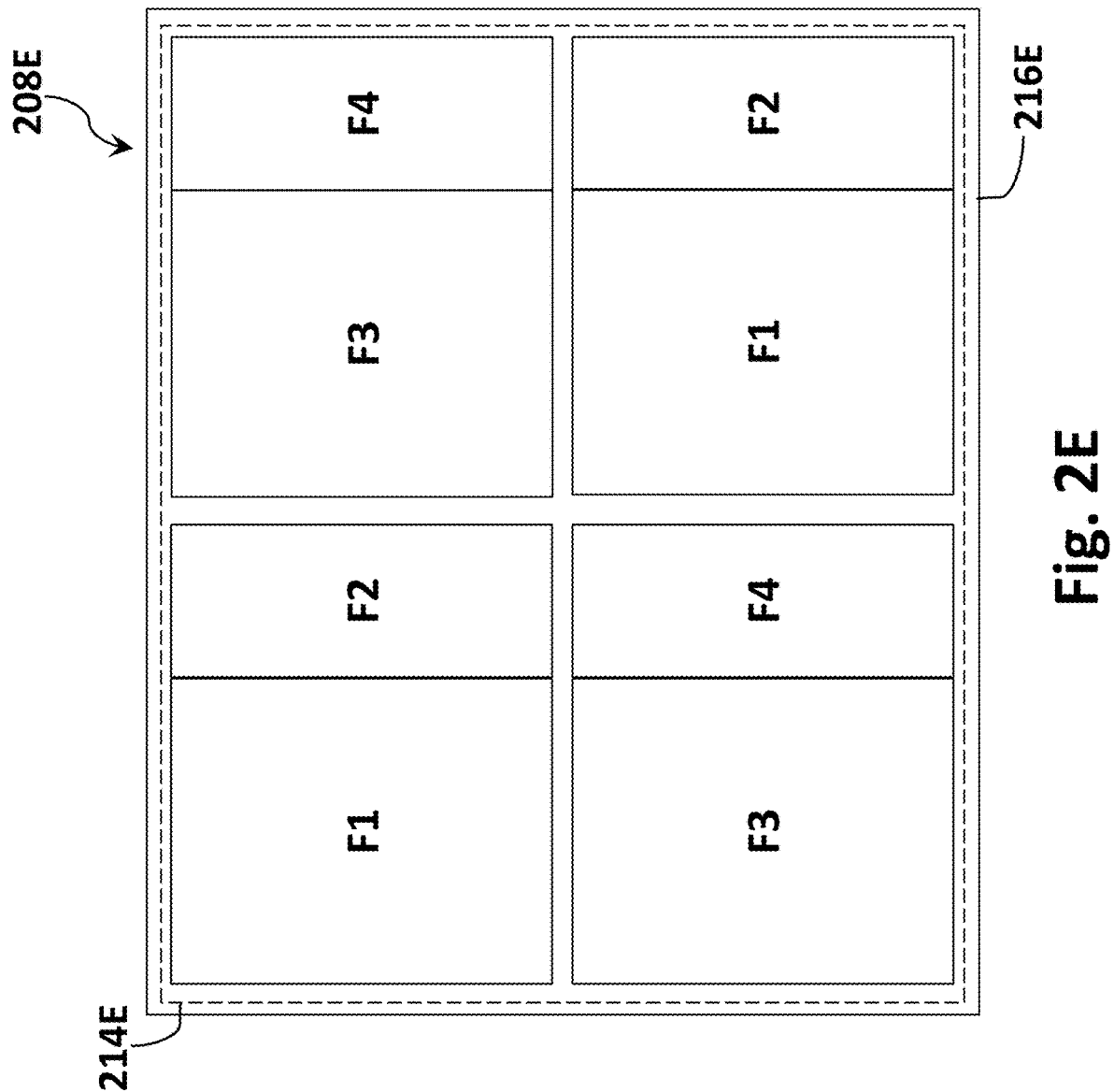
FIG. 2E schematically illustrates a sub-pixel repeat cell array design embodiment for use in a TIR-based display according to another embodiment of the disclosure.

FIG. 2E schematically illustrates a sub-pixel repeat array cell design embodiment for use in a TIR-based display according to another embodiment of the disclosure. In an exemplary embodiment, layer 208 may comprise CFA design embodiment 208E in display embodiment 200. CFA embodiment of 208E illustrates a sub-pixel repeat cell 214E having eight sub-pixel color filters which are denoted as F1, F2, F3 and F4 (i.e., sub-pixel filter 1, 2, 3 or 4). Repeat cell 214E comprises sub-pixel color filters arranged in a checkerboard-like pattern such as in 208C. Repeat cell 214 E highlighted by broken line is the basic repeating unit in the color filter array design embodiment 208E. Though eight sub-pixel color filters are shown in each repeat cell 214E, repeat cell 214E may comprise one to eight color filter sub-pixels or more. The sub-pixel color filters F1-F4 may comprise different dimensions. In FIG. 2E, F1 is approximately twice the width as F2, and F3 is approximately twice the width of F4. The dimensions of the sub-pixel color filters in the repeat cell may be of any size relative to the adjacent sub-pixel color filters within the same repeat cell. In some embodiments, CFA array 208E may comprise an optional border or mask 216E. In some embodiments, CFA array 208E may not comprise an optional border or mask 216E such that the edges of sub-pixel color filters F1, F2, F3 and F4 may be substantially touching to form a continuous array. Mask 216E may be one or more of white, black or clear. In an exemplary embodiment, each sub-pixel color filter in CFA 208E may be substantially aligned with a TFT.

In some embodiments, CFA 208E may comprise one or more of a black, white or clear mask around one or more sub-pixel color filters. It should be noted that in some embodiments, F2 and F4 may be different coordinates of green within the CIE 1931 chromaticity diagram. For example, in repeat cell designs 61-64 in Table 4, F2 may be a green-blue whereas F4 may be a green-yellow. When combined they may form a true green color but separately may be able to form a better or truer yellow or indigo colors when compared to when F2 and F4 are both a true green color.

For illustrative purposes, sub-pixel color filters F1-4 in 208B-E are in a rectangular shape. In any of CFA embodiments 208B-E, the sub-pixel color filters may be square, triangular, hexagonal, diamond, circular or any other shape. In other embodiments, the sub-pixel color filters may be a combination of one or more of square, triangular, hexagonal, diamond or circular shaped. The thickness of layer 208 and concentration of the dye in the color filters in layer 208 may be adjusted to control the saturation.

Figure 1C:
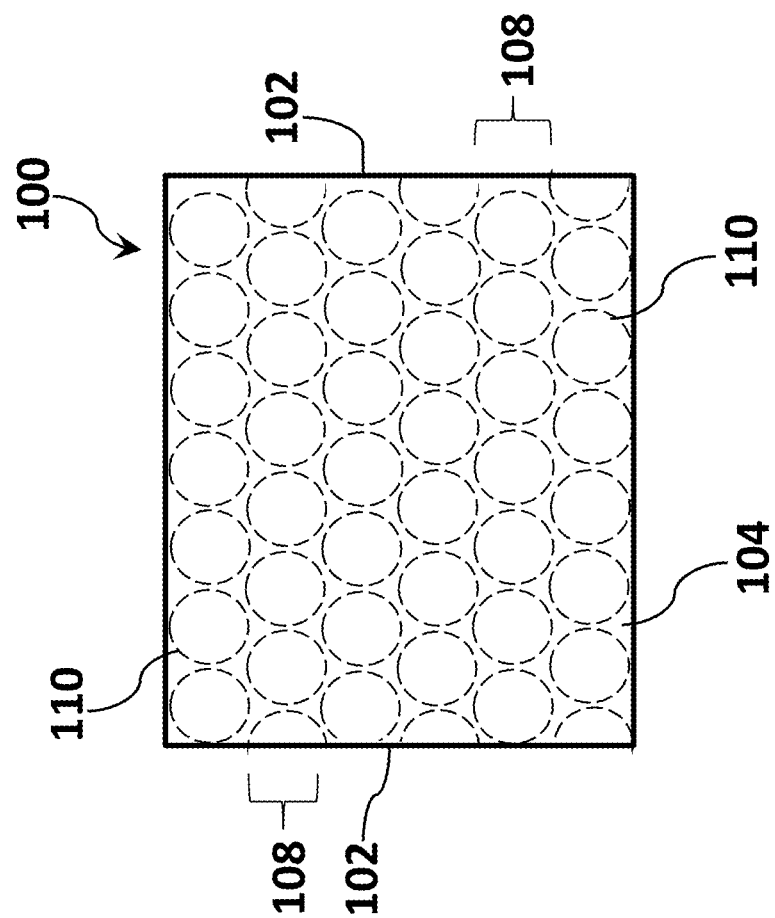
FIG. 1C schematically illustrates a plan view of a sheet of convex protrusions.

Referring again to FIG. 2A, front sheet 202 and protrusion layer 210 may be a continuous sheet of the same material wherein color filter array 208 may be located over the outer surface 204 of sheet 202 facing viewer 206. In other embodiments, front sheet 202 and protrusion layer 210 may be separate layers and comprised of different materials. In an exemplary embodiment, sheet 202 and protrusions 210 may comprise different refractive indices. In an exemplary embodiment, at least one protrusion 210 may comprise a high refractive index polymer. In some embodiments, convex protrusions 210 may be in the shape of hemispheres. In an exemplary embodiment, protrusions 210 may be arranged in a close-packed array. Protrusions 210 may be of any shape or size or a mixture of shapes and sizes. Protrusions 210 may be elongated hemispheres or hexagonally shaped or a combination thereof. In other embodiments, convex protrusions 210 may be microbeads embedded in sheet 202. Protrusions 210 may have a refractive index of about 1.4 or higher. In an exemplary embodiment, protrusions 210 may have a refractive index in the range of about 1.5-1.9. In certain embodiments, the protrusions may include materials having a refractive index in the range of about 1.5 to 2.2. In certain other embodiments, the high refractive index protrusions may be a material having a refractive index of about 1.6 to about 1.9. The protrusions may have a diameter of at least about 0.5 microns. The protrusions may have a diameter of at least about 2 microns. In some embodiments the protrusions may have a diameter in the range of about 0.5-5000 microns. In other embodiments the protrusions may have a diameter in the range of about 0.5-500 microns. In still other embodiments the protrusions may have a diameter in the range of about 0.5-100 microns. In still other embodiments the protrusions may have a diameter in the range of about 0.5-20 microns. Protrusions 210 may have a height of at least about 0.5 microns. In some embodiments the protrusions may have a height in the range of about 0.5-5000 microns. In other embodiments the protrusions may have a height in the range of about 0.5-500 microns. In other embodiments the protrusions may have a height in the range of about 0.5-50 microns. In still other embodiments the protrusions may have a height in the range of about 0.5-15 microns. High refractive index polymers that may be used to form convex protrusions 210 may comprise high refractive index additives such as metal oxides. The metal oxides may comprise one or more of $SiO_2$, $ZrO_2$, $ZnO_2$, $ZnO$ or $TiO_2$. In some embodiments, convex protrusions 210 may be in the shape of hemispheres as illustrated in FIG. 1A-C. Protrusions 210 may be of any shape or size or a mixture of shapes and sizes. Protrusions 210 may be elongated hemispheres or hexagonally shaped or a combination thereof. In some embodiments, the convex protrusions may be randomly sized and shaped. In some embodiments the protrusions may be faceted at the base and morph into a smooth hemispherical or circular shape at the top. In other embodiments, protrusions 210 may be hemispherical or circular in one plane and elongated in another plane. In an exemplary embodiment, the convex protrusions 210 may be manufactured by micro-replication. In other embodiments, convex protrusions 210 may be printed. In some embodiments, convex protrusions 210 may be printed directly onto color filter layer 208. In an exemplary embodiment, sheet 202 may be a rigid, flexible, stretchable or impact resistant material while protrusions 210 may comprise a rigid, high index material.

Display embodiment 200 may comprise a rear support layer 218. Display 200 may comprise a rigid, flexible or conformal rear support layer 218. Rear support layer 218 may be one or more of a metal, polymer, wood or other material. Layer 218 may one or more of glass, polycarbonate, polymethylmethacrylate (PMMA), polyurethane, acrylic, polyvinylchloride (PVC), polyimide or polyethylene terephthalate (PET). Rear support 218 may form a gap or cavity 220 therebetween with the layer of convex protrusions 210.

Rear support 218 may be further equipped with a rear electrode layer 222. Rear electrode layer 222 may be rigid, flexible or conformal. Layer 222 may comprise transparent conductive material or non-transparent conductive material such as aluminum, gold or copper. Rear electrode layer 222 may be vapor deposited or electroplated. Rear electrode 222 may be continuous or patterned. Rear electrode 222 may be integrated with rear support layer 218. Alternatively, rear electrode 222 may be positioned proximal to rear support 218. In another embodiment, rear electrode 222 may be laminated or attached to rear support layer 218. Rear electrode layer 222 may comprise at least one thin film transistor (TFT). Rear electrode layer 222 may comprise a TFT array or a passive matrix array. Rear electrode layer 222 may comprise a direct drive patterned array of electrodes or a segmented array of electrodes. Rear electrode layer 222 may comprise an active matrix of organic field-effect transistors (FETs). The organic FETs may comprise an active semiconducting layer of a conjugated polymer or a small conjugated molecule. The organic FETs may comprise an organic dielectric layer in the form of either a solution processed dielectric or a chemical vapor deposited dielectric. Layer 222 may comprise aluminum, ITO, copper, gold or other electrically conductive material. In one embodiment, layer 222 may comprise organic TFTs. In other embodiments, rear electrode layer 222 may comprise indium gallium zinc oxide (IGZO) TFTs. Layer 222 may comprise low temperature polysilicon, low temperature polysilicon manufactured by a polyimide "lift-off" process, amorphous silicon on a rigid or flexible substrate. In an exemplary embodiment, each TFT of rear electrode layer 222 may be substantially aligned or registered with at least one sub-pixel filter in color filter array layer 208.

Display 200 may further comprise a front electrode layer 224 on the surface of the layer of convex protrusions 210. Front electrode layer 224 may be rigid, flexible or conformable. Front electrode layer 224 may comprise a transparent conductive material such as indium tin oxide (ITO), Baytron™, or conductive nanoparticles, silver wires, metal nanowires, graphene, nanotubes, or other conductive carbon allotropes or a combination of these materials dispersed in a substantially transparent polymer. Front electrode layer 224 may comprise a transparent conductive material further comprising silver nano-wires manufactured by C3Nano (Hayward, Calif., USA). Front electrode layer 224 may comprise C3Nano ActiveGrid™ conductive ink.

In an exemplary embodiment, display 200 may comprise a planarization layer 226. Planarization layer 226 may be used to smooth the surface of the backplane drive electronics. This may allow complete sidewalls or partial sidewalls to be placed or formed on top of the planarization layer. Planarization layer 226 may comprise a polymer. Planarization layer 226 may be deposited using a slot die coating process or flexo-print process. Planarization layer 226 may comprise a photoresist. Planarization layer 226 may also act as a dielectric layer. Planarization layer 226 may comprise a polyimide.

Display 200 may further include at least one optional dielectric layer on one or more of the front electrode 224, rear electrode layer 222 or planarization layer 226. For illustrative purposes only, display 200 shows dielectric layer 228 on planarization layer 226, but layer 228 may be located elsewhere as described. In some embodiments, a dielectric layer on front electrode 224 may comprise a different composition than a dielectric layer 228 on rear electrode 222. In an exemplary embodiment, the optional dielectric layers may comprise two or more sub-layers of dielectric materials. The sub-layers may comprise different materials. For example, a front dielectric layer or rear dielectric layer 228 may comprise a sub-layer of $SiO_2$ and a second sub-layer of polyimide. The dielectric layers may be substantially uniform, continuous and substantially free of surface defects. The dielectric layers may be at least about 0.05 nm (i.e., approximately a monolayer) in thickness or more. In some embodiments, the dielectric layer thicknesses may be in the range of about 1-300 nm. In other embodiments, the dielectric layer thicknesses may be in the range of about 1-200 nm. In still other embodiments, the dielectric layer thicknesses may be about 1-100 nm. In still other embodiments, the dielectric layer thicknesses may be about 1-50 nm. In still other embodiments, the dielectric layer thicknesses may be about 1-20 nm. In still other embodiments, the dielectric layer thicknesses may be about 1-10 nm. The dielectric layers may comprise at least one pin hole. The dielectric layer may define a conformal coating and may be free of pin holes or may have minimal pin holes. The dielectric layer may also be a structured layer. The dielectric layer may also act as a barrier layer to prevent moisture or gas ingress. The dielectric layers may have a high or low dielectric constant. In some embodiments, the dielectric layers may have a dielectric constant in the range of about 1-30. In other embodiments, the dielectric layers may have a dielectric constant in the range of about 1-15. Dielectric compounds may be organic or inorganic in type. The most common inorganic dielectric material is $SiO_2$ commonly used in integrated chips. The dielectric layer may be one or more of $SiO_x$, SiN, $SiN_x$ or SiON. The one or more dielectric layers may comprise one or more of $Al_2O_3$, $AlO_x$, CaO, CuO, $Er_2O_3$, $Ga_2O_3$, $HfO_2$, $HfO_x$, InZnO, InGaZnO, $La_2O_3$, MgO, $Nb_2O_5$, $Sc_2O_3$, $SnO_2$, $Ta_2O_5$, $TiO_2$, $V_xO_y$, $Y_2O_3$, $Yb_2O_3$, $ZnSnO_x$, ZnO, $ZrO_2$, AlN, BN, GaN, SiN, $SiN_x$, TaN, $TaN_x$, TiAlN, TiN, WN or $TiN_x$. The dielectric layer may be a ceramic. Organic dielectric materials are typically polymers such as polyimides, fluoropolymers, polynorbornenes and hydrocarbon-based polymers lacking polar groups. The dielectric layers may be a polymer or a combination of polymers. The dielectric layers may be combinations of polymers, metal oxides and ceramics. The dielectric layers may comprise one or more of the following polyimide-based dielectrics Dalton DL-5260T, TC-139, DL-2193, Nissan SE-150, SE-410, SE-610, SE-3140N, SE-3310, SE-3510, SE-5661, SE-5811, SE-6414, SE-6514, SE-7492, SE-7992 or JSR AL-1054, AL-3046, AL22620, AL16301, AL60720. In an exemplary embodiment, the dielectric layers comprise Parylene. In other embodiments the dielectric layers may comprise a halogenated Parylene. The dielectric layers may comprise Parylene C, Parylene N, Parylene F, Parylene HT or Parylene HTX. Other inorganic or organic dielectric materials or combinations thereof may also be used for the dielectric layers. One or more of the dielectric layers may be CVD, PECVD or sputter coated. One or more of the dielectric layers may be a solution coated polymer, vapor deposited dielectric or sputter deposited dielectric. Dielectric layer 228 may be conformal to rear electrode structures or could be used to planarize the electrode structures. Planarization of the electrode structures leading to a smoother and more even surface may allow for deposition of sidewalls with more uniform height and thicknesses.

In an exemplary embodiment, one or more dielectric layers in display 200 may be deposited by one or more methods of chemical vapor deposition (CVD), plasma enhanced chemical vapor deposition (PECVD) or thermal or plasma enhanced atomic layer deposition (ALD).

Display embodiment 200 may further comprise a low refractive index medium 230 located between the front electrode layer 224 and rear electrode layer 222 in gap 220. Medium 230 may be air or a liquid. Medium 230 may be an inert, low refractive index fluid medium. Medium 230 may be a hydrocarbon. In some embodiments the refractive index of medium 230 may be in the range of about 1 to 1.5. In still other embodiments, the refractive index of medium 230 may be about 1.1 to 1.4. In an exemplary embodiment, medium 230 may be a fluorinated hydrocarbon. In another exemplary embodiment, medium 230 may be a perfluorinated hydrocarbon. In an exemplary embodiment, medium 230 has a refractive index less than the refractive index of convex protrusions 212. In other embodiments, medium 230 may be a mixture of a hydrocarbon and a fluorinated hydrocarbon.

In an exemplary embodiment, medium 230 may comprise one or more of Fluorinert™, Novec™ 7000, Novec™ 7100, Novec™ 7300, Novec™ 7500, Novec™ 7700, Novec™ 8200, electrowetting materials, Teflon™ AF, CYTOP™ or Fluoropel™.

Medium 230 may further comprise one or more of a viscosity modifier or a charge control agent. Conventional viscosity modifiers include oligomers or polymers. Viscosity modifiers may include one or more of a styrene, acrylate, methacrylate or other olefin-based polymers. In one embodiment, the viscosity modifier is polyisobutylene. In another embodiment, the viscosity modifier is a halogenated polyisobutylene.

Medium 230 may further include a first plurality of light absorbing electrophoretically mobile particles 232. Mobile particles 232 may comprise a first charge polarity and first optical characteristic (i.e. color or light absorption characteristic). In some embodiments, medium 230 may further include a second plurality of electrophoretically mobile particles and may comprise a second charge of opposite polarity and a second optical characteristic. Particles 232 may be formed of an organic material or an inorganic material or a combination of an organic and inorganic material. Particles 232 may be a dye or a pigment or a combination thereof. Particles 232 may be at least one of carbon black, a metal or metal oxide. The particles may have a polymer coating. In one embodiment, particles 232 may comprise a positive charge polarity or a negative charge polarity or a combination thereof. Particles 232 may comprise weakly charged or uncharged particles. Particles 232 may be light absorbing or light reflecting or a combination thereof.

In other embodiments, display embodiment 200 may comprise a plurality of light absorbing particles 232 and a second plurality of light reflecting particles. The light reflective particles may comprise a white reflective particle such as titanium dioxide ($TiO_2$). The light reflective particles may be around 200-300 nm. This is a typical size of $TiO_2$ particles used in the paint industry to maximize the light reflectance properties. Particles of larger or smaller sizes may also be used. The light reflective particles may further comprise a coating (not shown). The coating may comprise of an effective refractive index that is substantially similar to the refractive index of medium 230. In some embodiments, the difference between the refractive indices of the coating on the light reflecting particles and medium 230 may be about 40% or less. In other embodiments, the difference between the refractive indices of the coating on the light reflecting particles and medium 230 may be about 0.5-40%.

In other embodiments, an electrowetting fluid may be located in gap 220. In an exemplary embodiment, the electrowetting fluid may comprise a dye. The electrowetting fluid may move towards layer of protrusions 210 into the evanescent wave region to frustrate TIR. The electrowetting fluid may move away from layer of protrusions 210 and out of the evanescent wave region to allow for TIR. The electrowetting fluid may be a silicone oil that may be pumped via small channels into and out of the wells formed by sidewalls.

Display embodiment 200 may comprise a voltage bias source 234. Bias source 234 may create an electromagnetic flux in gap 220 formed between front electrode 224 and rear electrode 222. The flux may extend to any medium 230 disposed in the gap. The flux may move at least one of particles 232 towards one electrode and away from the opposing electrode at one or more sub-pixels.

Bias source 234 may be coupled to one or more processor circuitries and memory circuitries configured to change or switch the applied bias in a predefined manner and/or for predetermined durations. For example, the processing circuitry may switch the applied bias to display characters on display 200.

In some embodiments, display 200 in FIG. 2 may comprise at least one transparent barrier layer 236. Barrier layer 236 may be located on the outer surface 204 of sheet 202. Barrier layer 236 may be located in various locations within the TIR-based display embodiment described herein. Barrier layer 236 may act as one or more of a gas barrier or moisture barrier and may be hydrolytically stable. Barrier layer 236 may be one or more of a rigid, flexible or conformable polymer. Barrier layer 236 may comprise one or more of polyester, polypropylene, polyethylene terephthalate, polyethylene naphthalate or copolymer, or polyethylene. Barrier layer 236 may comprise one or more of a chemical vapor deposited (CVD) or sputter coated ceramic-based thin film on a polymer substrate. The ceramic may comprise one or more of $Al_2O_3$, $SiO_2$ or other metal oxide. Barrier layer 236 may comprise one or more of a Vitriflex barrier film, Invista OXYCLEAR® barrier resin, Toppan GL™ barrier films GL-AEC-F, GX-P-F, GL-AR-DF, GL-ARH, GL-RD, Celplast Ceramis® CPT-036, CPT-001, CPT-022, CPA-001, CPA-002, CPP-004, CPP-005 silicon oxide ($SiO_x$) barrier films, Celplast CAMCLEAR® aluminum oxide (AlOx) coated clear barrier films, Celplast CAMSHIELD® T AlOx-polyester film, Torayfan® CBH or Torayfan® CBLH biaxially-oriented clear barrier polypropylene films.

In some embodiments, display 200 may comprise a diffuser layer 238. Diffuser layer 238 may be used to soften the incoming light or reflected light or to reduce glare. Diffuser layer 238 may comprise a rigid or flexible polymer or glass. Diffuser layer 238 may comprise ground glass in a flexible polymer matrix. Layer 238 may comprise a micro-structured or textured polymer. Diffuser layer 238 may comprise 3M™ anti-sparkle or anti-glare film. Diffuser layer 238 may comprise 3M™ GLR320 film (Maplewood, Minn.) or AGF6200 film. Diffuser layer 238 may be located at one or more various locations within display embodiment 200. In an exemplary embodiment, diffuser layer 238 may be located be located between sheet 202 and viewer 206.

In exemplary embodiments, display 200 may comprise one or more sidewalls. Sidewalls 240 in display 200 are similar to sidewalls 148 in display 100 illustrated in FIG. 1A. Sidewalls 240 may also be referred to as cross-walls, partition walls or pixel walls. Sidewalls 240 may limit particle settling, drift and diffusion to improve display performance and bistability. In an exemplary embodiment, sidewalls 240 may substantially maintain a uniform gap distance between front electrode 224 and rear electrode layer 222. Sidewalls 240 may also act as a barrier to aid in preventing prevent moisture and oxygen ingress into the display. Sidewalls 240 may be located within the light modulation layer comprising particles 232 and medium 230. Sidewalls 240 may completely or partially extend from the front electrode, rear electrode or both the front and rear electrodes. Sidewalls 240 may comprise polymer, metal or glass or a combination thereof. Sidewalls 240 may be any size or shape. Sidewalls 240 may have a rounded cross-section. Sidewalls 240 may have refractive indices within about 0.01-0.2 of the refractive indices of convex protrusions 210. In an exemplary embodiment, sidewalls may be optically active. Sidewalls 240 may create wells or compartments to confine electrophoretically mobile particles 232 suspended in medium 230. Sidewalls 240 may be configured to create wells or compartments in, for example, square-like, triangular, pentagonal or hexagonal shapes or a combination thereof. Sidewalls 240 may comprise a polymeric material and patterned by one or more conventional techniques including photolithography, embossing or molding. In certain embodiments, display 200 comprises sidewalls that completely bridge gap 220. In other embodiments, display embodiment 200 may comprise partial sidewalls that only partially bridge gap 220. In certain embodiments, the reflective image display 200 may comprise a combination of sidewalls and partial sidewalls that may completely or partially bridge gap 220. In an exemplary embodiment, sidewalls 240 may be comprised of a rigid, flexible or conformal polymer. In other embodiments, sidewalls 240 may be substantially aligned with color filter sub-pixels of color filter layer 208.

In some embodiments, sidewalls 240 may be formed on top of rear dielectric layer 228, rear electrode layer 222, planarization layer 226 or rear substrate 218. In an exemplary embodiment, display 200 may comprise sidewalls 240 directly on top of rear dielectric layer 228. In other embodiments, sidewalls 240 may be formed as part of the array layer of convex protrusions 210. Sidewalls 240 and convex protrusions 210 may be formed by the same micro-replication process. A dielectric layer may subsequently formed on both the front electrode layer 224 and sidewalls 240. Sidewalls 240 may be formed on top of planarization layer 226.

In some embodiments, sidewalls may enclose a region and form at least one compartment (i.e., well) within gap 220 comprising electrophoretically mobile particles 232 that modulates the light for one sub-pixel repeat cell. The compartments may form arrays wherein each compartment is substantially aligned with one sub-pixel repeat cell. The repeat cells are illustrated by 214B-E in FIGS. 2B-E. In other embodiments, sidewalls may enclose a region and form a compartment (i.e., well) within gap 220 that comprises electrophoretically mobile particles 232 that modulates the light for one sub-pixel (sub-pixels are labeled F1, F2, F3 and F4 in FIGS. 2B-E). The compartments may form arrays that are substantially aligned with individual sub-pixels within the sub-pixel repeat cells.

In some embodiments, display 200 in FIG. 2A may comprise one or more dielectric layers located on the surface of the sidewalls 240. Dielectric layer 242 may comprise of similar materials described previously herein for dielectric layer 228. Dielectric layer 242 on the surface of sidewall 240 may be formed by methods such as CVD, PECVD, sputter coated, solution coated, vapor deposited, thermal or plasma enhanced ALD. The dielectric layer may comprise two or more dielectric sub-layers. The sub-layers may comprise of the same or different materials. The sub-layers may be formed by different deposition processes.

In some embodiments, display 200 may further comprise a conductive cross-over (not shown) in FIG. 2A. A conductive cross-over may bond to the front electrode layer 224 and to a trace on rear electrode layer 222 such as a TFT. This may allow a driver integrated circuit (IC) to control the voltage at front electrode 224. In an exemplary embodiment, the conductive cross-over may comprise an electrically conductive adhesive that is flexible or conformal.

In exemplary embodiments, display 200 may comprise a directional front light system. Directional front light system 244 may comprise an outer surface facing viewer 206. Directional front light system 244 may comprise light source 246 to emit light through an edge of light guide 248. Light source 246 may comprise one or more of a light emitting diode (LED), cold cathode fluorescent lamp (CCFL) or a surface mounted technology (SMT) incandescent lamp. In an exemplary embodiment, light source 246 may define an LED whose output light emanates from a refractive or reflective optical element that concentrates said diode's output emission in a condensed angular range to an edge of light guide 248. In some embodiments, light source 246 may be optically coupled to light guide 248.

Light guide 248 may comprise one or more of a rigid, flexible or conformable polymer. Light guide 248 may comprise more than one layer. Light guide 248 may comprise one or more contiguous light guiding layers parallel to each other. Light guide 248 may comprise at least a first light guiding layer that forms a transparent bottom surface. Light guide 248 may comprise a second layer that forms a transparent top or outer surface. Light guide 248 may comprise a third layer that forms a central transparent core. The refractive indices of the layers of light guide 248 may differ by at least 0.05. The multiple layers may be optically coupled. In an exemplary embodiment, light guide 248 may comprise an array of light extractor elements. The light extractor elements may comprise one or more of light scattering particles, dispersed polymer particles, tilted prismatic facets, parallel prism grooves, curvilinear prism grooves, curved cylindrical surfaces, conical indentations, spherical indentations, aspherical indentations or air pockets. The light extractor elements may be arranged such that they redirect light towards a semi-retro-reflective display sheet in a substantially perpendicular direction with a non-Lambertian narrow-angle distribution. Light guide 248 may comprise diffusive optical haze. Light guide 248 may be configured to direct light to front surface 204 of transparent sheet 202 while the light extractor elements direct the light in a perpendicular direction within a narrow angle, for example, centered about a 30° cone, towards front sheet 202. Light guide system 244 may comprise a FLEx Front Light Panel made from FLEx Lighting (Chicago, Ill.). Light guide 248 may comprise an ultra-thin, flexible light guide film manufactured by Nanocomp Oy, Ltd. (Lehmo, Finland).

In some embodiments, display 200 in FIG. 2A may further comprise an ambient light sensor (ALS) 250 and a front light controller 252. ALS 250 may be used to detect the amount of ambient light present and send this information to front light controller 252. Front light controller 252 may then control front light system 244 to modulate the amount of light emitted by system 244 depending on the amount of ambient light available. For example, in a dimly lit room front light controller 252 would increase the amount of emitted from light front flight system 244. On a sunny day on the beach, for example, front light controller 252 may completely turn off front light system 244.

In some embodiments, display 200 in FIG. 2A may include at least one optically clear adhesive (OCA) layer 254. OCA's may be used to adhere display layers together and to optically couple layers throughout the display. For example, OCA 254 layer may be used to adhere and optically couple front light system 244 to one or more of outer surface 204 of sheet 202, diffuser layer 238 or barrier layer 236. Display embodiment 200 may comprise optically clear adhesive layers further comprised of one or more of 3M™ optically clear adhesives 3M™ 8211, 3M™ 8212, 3M™ 8213, 3M™ 8214, 3M™ 8215, 3M™ OCA 8146-X, 3M™ OCA 817X, 3M™ OCA 821X, 3M™ OCA 9483, 3M™ OCA 826XN or 3M™ OCA 8148-X, 3M™ CEF05XX, 3M™ CEF06XXN, 3M™ CEF19XX, 3M™ CEF28XX, 3M™ CEF29XX, 3M™ CEF30XX, 3M™ CEF31, 3M™ CEF71XX, Lintec MO-T020RW, Lintec MO-3015UV series, Lintec MO-T015, Lintec MO-3014UV2+, Lintec MO-3015UV.

Figure 2F:
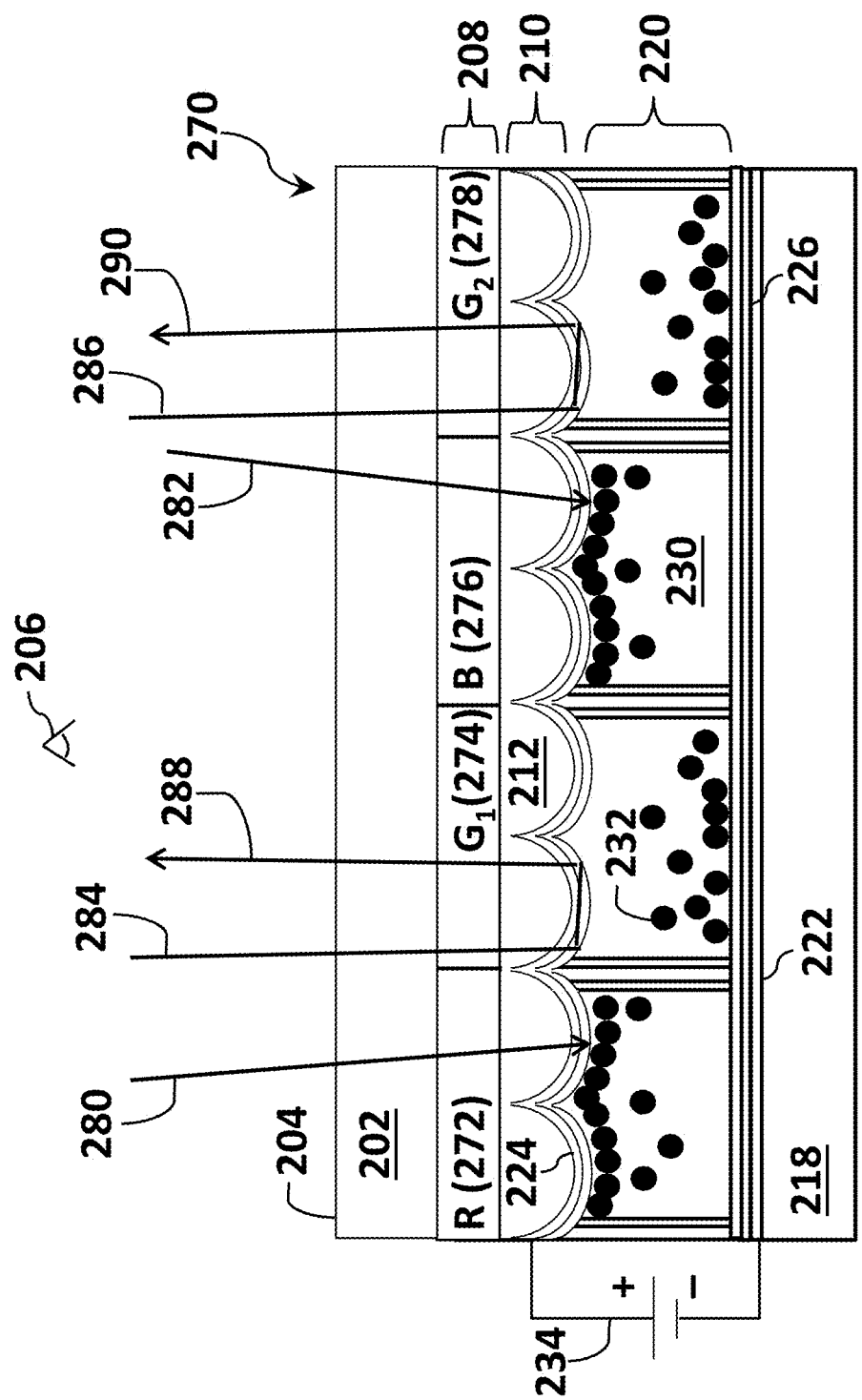
FIG. 2F schematically illustrates operation of an exemplary embodiment of a TIR-based display according to one aspect of the disclosure.

FIG. 2F illustrates how TIR-based display embodiment 200 may be operated. Display 270 in FIG. 2F is a modified version of display 200 in FIG. 2A wherein some components have been omitted for clarity and a more detailed view of a sub-pixel repeat cell is illustrated. CFA layer 208 comprises a repeat cell further comprising a red R sub-pixel 272, a first green sub-pixel $G_1$ 274, a blue B sub-pixel 276 and a second green sub-pixel $G_2$ 278. Electrophoretically mobile particles 232 may be moved near or away from front electrode 224. It is assumed in FIG. 2F that particles 232 have a negative charge polarity, for illustrative purposes only. In some embodiments, particles 232 may comprise a positive charge polarity. In some embodiments, particles 232 may comprise a negative and positive charge. When a positive voltage bias is applied at front electrode 224 by bias source 234, negatively charged particles 232 may be moved into the evanescent wave region near front electrode 224. This is illustrated in FIG. 2F where particles 232 are brought near front electrode 224 behind red and blue sub-pixels 272 and 276, respectively. When particles 232 are located in the evanescent wave region, they may absorb incident light and frustrate TIR creating a dark state at a sub-pixel in a TIR-based display using conventional CFA design or in a TIR-based display utilizing sub-pixel rendering. This is illustrated in FIG. 2F by representative incident light rays 280, 282. Light rays 280, 282 pass through display 270 where they may be absorbed by particles 232 at the red 272 and blue 276 sub-pixels.

A positive voltage bias may be applied by bias source 234 at rear electrode 222. Negatively charged particles 232 may be moved near the rear electrode layer 222. When particles 232 are located away from near front electrode 224 and out of the evanescent wave region, light by be totally internally reflected at the interface of protrusion layer 210 and low refractive index medium 230. This allows incident light to be reflected in a semi-retroreflective manner back towards viewer 206. This creates a light or bright state as observed by viewer 206. This is represented by incident light rays 284, 286 that are reflected by TIR back towards viewer 206. The reflected light rays are represented by rays 288 and 290, respectively. The bright and dark states of the display embodiments described herein may be modulated by movement of particles 232 in medium 230 by bias source 234.

In a conventional CFA design, the pixel comprising sub-pixels 272, 274, 276, 278 would appear green to viewer 206 wherein the sub-pixels are 1:1 mapped to a pixel. In sub-pixel rendering, the repeat cell in FIG. 2F would also appear green to viewer 206 if the sub-pixels are mapped 1:1 to the repeat cell which would be considered a pixel during image driving. The sub-pixels 272, 274, 276, 278 may also be mapped to one or more adjacent pixels depending on the images being produced. For example, green sub-pixel 274 may be mapped to one or more logical pixels during sub-pixel rendered driving while green sub-pixel 278 may be mapped to one or more logical pixels that may share or may not share green sub-pixel 274 from the same repeat cell.

In exemplary embodiments, any of the display embodiments described herein may be driven by backplane electronics comprising an active matrix thin film transistor array typically used in liquid crystal displays (LCDs). The backplane electronic is discussed in relation to FIG. 3.

Figure 3:
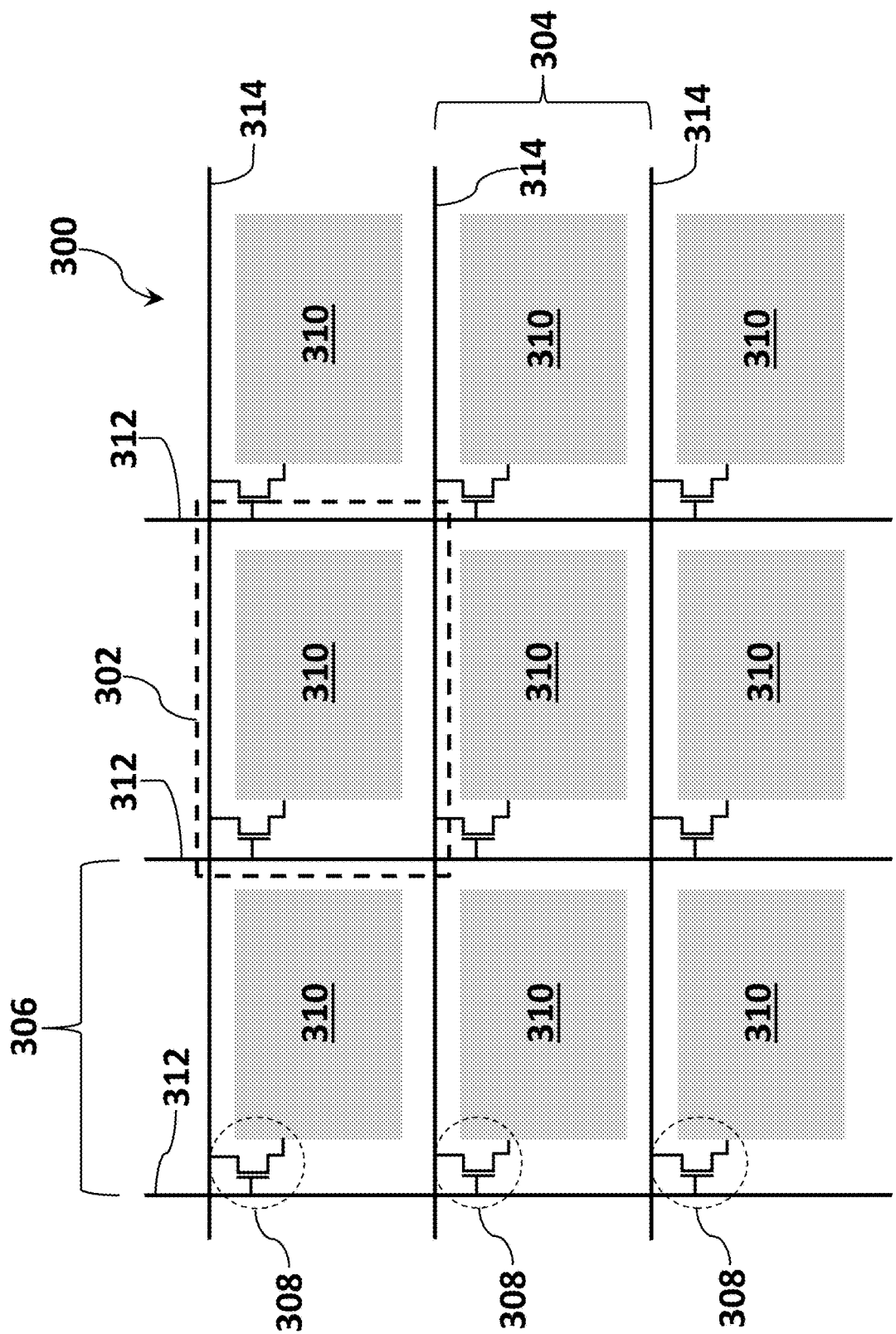
FIG. 3 schematically illustrates an embodiment of a portion of an active matrix thin film transistor array for driving a flexible or conformal TIR-based display.

FIG. 3 schematically illustrates an embodiment of a portion of an active matrix thin film transistor (TFT) array for driving a rigid, flexible or conformal TIR-based display.

Backplane electronics embodiment 300 is comprised of an array of sub-pixels 302 that may be used to drive a flexible TIR-based display. A single sub-pixel 302 is highlighted by broken line box 302 in FIG. 3. Sub-pixels 302 may be arranged in rows 304 and columns 306 as illustrated in FIG. 3 but other arrangements may be possible. In an exemplary embodiment, each sub-pixel 302 may comprise a single TFT 308 and may be further aligned with a single sub-pixel color filter. In array embodiment 300, each TFT 308 is located in the upper left of each pixel 302. In other embodiments, the TFT 308 may be placed in other locations within each pixel 302. Each pixel 302 may further comprise a conductive electrode 310 to address each sub-pixel of the display as discussed in relation to FIGS. 2A-2E. Electrode 310 may comprise ITO, aluminum, copper, gold, Baytron™, or conductive nanoparticles, silver wires, metal nanowires, graphene, nanotubes, or other conductive carbon allotropes or a combination of these materials dispersed in a polymer. Backplane electronics embodiment 300 may further comprise column 312 and row 314 wires. Column wires 312 and row wires 314 may comprise a metal such as aluminum, copper, gold or other electrically conductive metal. Column 312 and row 314 wires may comprise ITO. The column 312 and row 314 wires may be attached to TFTs 308. Sub-pixels 302 may be addressed in rows and columns. TFTs 308 may be formed using amorphous silicon or polycrystalline silicon. The silicon layer for TFTs 308 may be deposited using plasma-enhanced chemical vapor deposition (PECVD). Each electrode 310 may be substantially aligned with a single sub-pixel color filter in layer 208, 208B-E (discussed below). Column wires 312 and row wires 314 may be further connected to integrated circuits and drive electronics to drive the display.

In an exemplary embodiment, any of the reflective image display embodiments disclosed herein may be rigid, flexible or conformable. In some embodiments, the components of the reflective image display embodiments disclosed herein may be flexible and may provide rigidity and stability to said reflective image display embodiments disclosed herein.

In other embodiments, any of the reflective image display embodiments disclosed herein may further include at least one spacer structure (not shown). The spacer structures may be used to control the gap between the front and rear electrodes. Spacer structures may be used to support the various layers in the displays. The spacer structures may be in the shape of circular or oval beads, blocks, cylinders or other geometrical shapes or combinations thereof. The spacer structures may comprise glass, metal, plastic or other resin.

At least one edge seal (not shown) may be employed with the disclosed display embodiments. The edge seal may prevent ingress of moisture or other environmental contaminants from entering the display. The edge seal may be a thermally, chemically or a radiation cured material or a combination thereof. The edge seal may comprise one or more of an epoxy, silicone, polyisobutylene, acrylate or other polymer based material. In some embodiments the edge seal may comprise a metallized foil. In some embodiments, the edge seal may comprise a filler such as $SiO_2$ or $Al_2O_3$.

In some embodiments, a porous reflective layer (not shown) may be used in combination with the disclosed display embodiments. The porous reflective layer may be interposed between the front and rear electrode layers. In other embodiments the rear electrode may be located on the surface of the porous electrode layer.

In certain implementations, an image processing circuit (interchangeably, processor, driver or controller) may dynamically select sub-pixels to form repeating units based on external factors such as non-user configurable attributes (e.g., available ambient lighting, the brightness of the image to be displayed) and user-configurable attributes (e.g., brightness, display size, etc.). The controller may elect the same repeating unit for each frame or it may dynamically select and form different grouping of sub-pixels for a repeating unit.

Various control mechanisms for the invention may be implemented fully or partially in hardware, software and/or firmware. For example, the function of dynamically selecting sub-pixels to form repeating units may be implemented by one or more controllers which may be released through hardware (e.g., processor circuitry), software (e.g., virtual processor) or firmware (combination of hardware and software). The controller(s) may execute a set of instructions contained in, or on, a non-transitory computer-readable storage medium or on hardware as described above. Those instructions may then be read and executed by one or more processors (actual or virtual) to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

In some embodiments, a tangible machine-readable non-transitory storage medium that contains instructions may be used in combination with the disclosed display embodiments. In other embodiments the tangible machine-readable non-transitory storage medium may be further used in combination with one or more processors.

Figure 4:
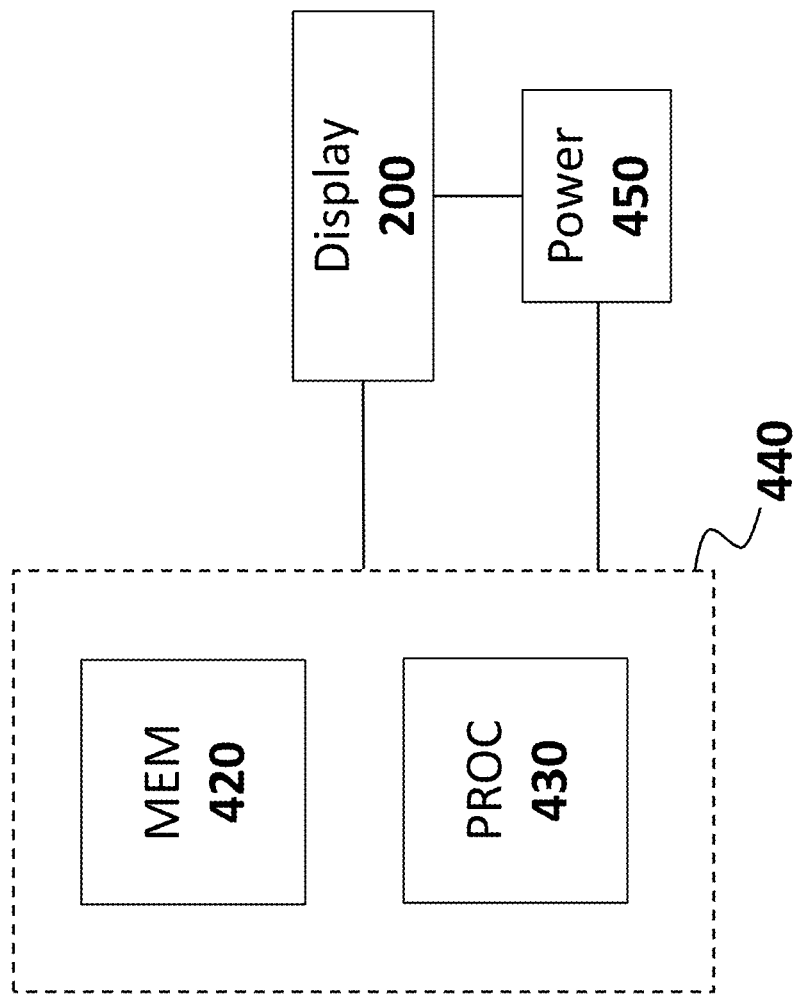
FIG. 4 schematically illustrates an exemplary system for implementing an embodiment of the disclosure.

FIG. 4 shows an exemplary system for controlling (e.g., driver circuit) a display according to one embodiment of the disclosure. In FIG. 4, display 200 is controlled by controller 440 having processor 430 and memory 420. Other control mechanisms and/or devices may be included in controller 440 without departing from the disclosed principles. Controller 440 may define hardware, software or a combination of hardware and software. For example, controller 440 may define a processor programmed with instructions (e.g., firmware). Processor 430 may be an actual processor or a virtual processor. Similarly, memory 420 may be an actual memory (i.e., hardware) or virtual memory (i.e., software).

Memory 420 may store instructions to be executed by processor 430 for driving display 200. An exemplary set of instructions is discussed below in relation to FIG. 5. The instructions may be configured to operate display 200. In one embodiment, the instructions may include biasing electrodes associated with display 200 through power supply 450. When biased, the electrodes may cause movement of electrophoretic particles towards or away from a region proximal to the surface of the plurality of protrusions at the inward surface of the front transparent sheet to thereby absorb or reflect light received at the inward surface of the front transparent sheet. By appropriately biasing the electrodes, particles (e.g., particles 232 in FIG. 2) may be moved near the surface of the plurality of protrusions at the inward surface of the front transparent sheet into or near the evanescent wave region in order to substantially or selectively absorb or reflect the incoming light. Absorbing the incoming light creates a dark or colored state. By appropriately biasing the electrodes, particles (e.g., particles 232 in FIG. 2) may be moved away from the surface of the plurality of protrusions at the inward surface of the front transparent sheet and out of the evanescent wave region in order to reflect or absorb the incoming light. Reflecting the incoming light creates a light state.

FIG. 5 is a flow diagram for implementing an embodiment of the disclosure in a totally-internally reflective image display. The flow diagram of FIG. 5 may be implemented in software as an algorithm in the image driver. The image driver may comprise a memory circuitry in communication with a processor circuitry as described in relation to FIG. 4. The steps of flow diagram may also be implemented purely in software such as, for example, one or more virtual processors.

The flow diagram of FIG. 5 describes the algorithm at high level. The coding of the exemplary algorithm and the details thereof would be within the skills of an ordinary artisan. The process of FIG. 5 starts by identifying one or more attributes of an upcoming (or subsequent) frame of the image to be displayed as shown in step 502. The attributes may include frame attributes such as brightness, color dynamic and frame rate, to name a few. The attributes may also include external attributes such as ambient condition surrounding the display. For example, the display may include (or communicate with) one or more sensor to detect ambient lighting to adjust pixel brightness accordingly. The attributes may also include user-defined attributes such as brightness or display tint.

At step 504, the image driver dynamically selects sub-pixels from one or more repeat cells to form logical pixels. The sub-pixels are logically selected to provide the desired optical display condition. To this end, the driver may select a group of sub-pixels that are contiguously positioned (i.e., sub-pixels belonging to the same row or the same column) or the driver may select a group of sub-pixels that are discontiguously positioned (i.e., sub-pixels belonging to different rows and/or the columns). As discussed, the sub-pixels may be selected based to provide an optimal color, brightness and saturation conditions. Once the sub-pixels are identified, the sub-pixels of the array may be grouped to define a multiplicity of pixels.

At step 506, the TIR display is engaged to display the frame. That is, the top and bottom electrodes (see for example, FIG. 2A) can be biased to cause movement of the electrophoretic particles in medium 230. The movement of electrophoretic particles combined with the dynamically selected sub-pixels will help display the upcoming frame.

At step 508, inquiry is made as to whether a subsequent frame is to be displayed. If the answer inquiry is yes, the process of FIG. 5 is repeated for the subsequent frame. In this manner, a subsequent repeating unit may comprise a different grouping of subpixels to accommodate a subsequent frame. A subsequent repeating unit may or may not share one or more sub-pixels with a preceding repeating unit. The selected sub-pixels may be groups of sub-pixels that are from discontiguous portions of the array and/or from sub-pixels that are not similarly sized. By dynamically selecting different sub-pixels, optimal images can be displayed while conserving display energy and manufacturing cost.

If the answer inquiry is no, the flow diagram proceeds to step 510 and the algorithm ends. The flow diagram of FIG. 5 may be repeated for each frame or for a group of frames. In an exemplary embodiment, the process of FIG. 5 is repeated 30 times per second to accommodate a thirty frame per second image display. Faster or slower implementation of repeating units are possible without departing from the disclosed principles.

In the exemplary display embodiments described herein, they may be used in Internet of Things (IoT) devices. The IoT devices may comprise a local wireless or wired communication interface to establish a local wireless or wired communication link with one or more IoT hubs or client devices. The IoT devices may further comprise a secure communication channel with an IoT service over the internet using a local wireless or wired communication link. The IoT devices comprising one or more of the display devices described herein may further comprise a sensor. Sensors may include one or more of a temperature, humidity, light, sound, motion, vibration, proximity, gas or heat sensor. The IoT devices comprising one or more of the display devices described herein may be interfaced with home appliances such as a refrigerator, freezer, television (TV), close captioned TV (CCTV), stereo system, heating, ventilation, air conditioning (HVAC) system, robotic vacuum, air purifiers, lighting system, washing machine, drying machine, oven, fire alarms, home security system, pool equipment, dehumidifier or dishwashing machine. The IoT devices comprising one or more of the display devices described herein may be interfaced with health monitoring systems such as heart monitoring, diabetic monitoring, temperature monitoring, biochip transponders or pedometer. The IoT devices comprising one or more of the display devices described herein may be interfaced with transportation monitoring systems such as those in an automobile, motorcycle, bicycle, scooter, marine vehicle, bus or airplane. The IoT devices may comprise a touch screen. The IoT devices may further comprise a voice recognition system.

In the exemplary display embodiments described herein, they may be used in IoT and non-IoT applications such as in, but not limited to, electronic book readers, portable computers, tablet computers, cellular telephones, smart cards, signs, watches, smart watches, fitness tracker (i.e., Fitbit™), wearables, military display applications, automotive displays, automotive license plates, shelf labels, flash drives and outdoor billboards or outdoor signs comprising a display. The automotive displays may include a dashboard, an odometer, speedometer, gas gauge, audio system or rear back up camera. The displays may be powered by one or more of a battery, solar cell, wind power, electrical generator, electrical outlet, AC power, DC power or other means.

The following examples are provided to further illustrate different embodiments of the disclosed principles. These examples are non-limiting.

Example 1 is directed to a totally-internally reflective ("TIR") display, comprising: a transparent front sheet having a first and a second surface; a plurality of convex-protrusions positioned over the first surface of the transparent front sheet; a plurality of color filter sub-pixels positioned over the second surface of the transparent front sheet, each color filter defining a portion of a repeat cell; one or more front electrodes formed over the convex-protrusions; one or more rear electrodes positioned to form a gap with the front electrode; a plurality of electrophoretic particles disposed in the gap; an image driver configured to dynamically select a plurality of sub-pixels from the array of sub pixels to form one or more logical pixels.

Example 2 is directed to the TIR display of example 1, wherein at least two of the dynamically selected sub-pixels are not adjacent to each other in a same column or a same row.

Example 3 is directed to the TIR display of example 1, wherein the dynamically selected sub-pixels of a logical pixel are adjacent to each other in a same column or a same row.

Example 4 is directed to the TIR display of example 1, wherein the sub-pixels a repeat cell are selected to in response to at least one of frame attributes, ambient condition or user-selected attributes.

Example 5 is directed to the TIR display of example 1, wherein at least two of the sub-pixels in a repeat cell have different sizes.

Example 6 is directed to the TIR display of example 1, further comprising a mask disposed between two adjacent sub-pixels.

Example 7 is directed to the TIR display of example 1, wherein the image driver is configured to dynamically select a first plurality of sub-pixels from one or more repeat cells to form a first logical pixel of a first frame of an image and to select a second plurality of sub-pixels from one or more repeat cells to form a second logical pixel to display a second frame of the image.

Example 8 is directed to the TIR display of example 7, wherein a first logical pixel and a second logical pixel share at least one sub-pixel.

Example 9 is directed to the TIR display of example 7, wherein a first logical pixel and a second logical pixel do not share a sub-pixel.

Example 10 is directed to the TIR display of example 1, wherein the display is driven using sub-pixel rendering.

Example 11 is directed to a totally-internally reflective (TIR) display, comprising: a sub-pixel array, each sub-pixel in the array further comprising a top electrode disposed over one or more convex protrusions, a bottom electrode separated from the top electrode to form a gap therebetween, a plurality of electrophoretic particles disposed in the gap, and a color filter; a processing circuitry; a memory circuitry in communication with the processing circuitry, the memory circuitry further comprises instructions to direct the processing circuitry to dynamically select a plurality of sub-pixels from the sub-pixel array to form a logical pixel; wherein the sub-pixels of the logical pixel are selected from a discontiguous group of sub-pixels.

Example 12 is directed to the TIR display of example 11, wherein the memory the memory circuitry further comprises instructions to direct the processing circuitry to dynamically select one or more sub-pixels to form a logical pixel as a function of ambient conditions.

Example 13 is directed to the TIR display of example 11, wherein the memory circuitry further comprises instructions to direct the processing circuitry to dynamically select one or more sub-pixels to form a logical pixel as a function of the upcoming frame attributes.

Example 14 is directed to the TIR display of example 11, wherein the memory circuitry further comprises instructions to direct the processing circuitry to dynamically select one or more sub-pixels to form a logical pixel as a function of the upcoming frame attributes.

Example 15 is directed to the TIR display of example 11, wherein the memory circuitry further comprises instructions to direct the processing circuitry to dynamically select a first plurality of sub-pixels from the array of sub pixels to form a first logical pixel of the frame of an image and to select a second plurality of sub-pixels to form a second logical pixel to display a second frame of the image.

Example 16 is directed to the TIR display of example 11, wherein the sub-pixels in the logical pixel have substantially the same size.

Example 17 is directed to the TIR display of example 11, wherein at least two of the sub-pixels in the logical pixel have different sizes.

Example 18 is directed to the TIR display of example 11, further comprising a mask disposed between two adjacent sub-pixels.

Example 19 is directed to the TIR display of example 11, wherein the display is driven using sub-pixel rendering.

Example 20 is directed to at least one non-transitory machine-readable medium including instructions to display an image having a plurality of frames in a totally-internally reflective (TIR) display, comprising: identifying one or more display attributes for a first frame to be displayed; dynamically selecting a first plurality of sub-pixels from a sub-pixel array to form a first logical pixel; and driving a plurality of electrophoretic particles from a first electrode to a second electrode to display a logical pixel of the first frame; wherein the first plurality of sub-pixels of the first logical pixel are selected from a discontiguous group of sub-pixels.

Example 21 is directed to the medium of example 20, further comprising: identifying one or more display attributes for a second frame to be displayed; dynamically selecting a second plurality of sub-pixels from the sub-pixel array to form a second logical pixel; and driving the plurality of electrophoretic particles between the first and the second electrodes to display the second logical pixel of the first frame.

Example 22 is directed to the medium of example 21, wherein the first logical pixel and the second logical pixel share at least one sub-pixel.

Example 23 is directed to the medium of example 21, wherein the first logical pixel and the second logical pixel comprise different sub-pixels.

Example 24 is directed to the medium of example 20, wherein the first logical pixel is substantially replicated throughout the sub-pixel array to display pixels of the first frame.

Example 25 is directed to the medium of example 20, wherein the sub-pixels in the first logical pixel have substantially the same size.

Example 26 is directed to the medium of example 20, wherein at least two of the sub-pixels in the first logical pixel have different sizes.

While the principles of the disclosure have been illustrated in relation to the exemplary embodiments shown herein, the principles of the disclosure are not limited thereto and include any modification, variation or permutation thereof.

What is claimed is:

1. A totally-internally reflective ("TIR") display, comprising: a transparent front sheet having a first and a second surface; a plurality of convex-protrusions positioned over the first surface of the transparent front sheet and configured to semi-retroreflect light; a plurality of color filters sub-pixels forming a sub-pixel color filter array, each color filter sub-pixel defining a portion of a repeat cell; one or more front electrodes formed over the convex-protrusions; one or more rear electrodes positioned to form a gap with the front electrode; a plurality of electrophoretic particles disposed in the gap; and an image driver configured to dynamically select a plurality of sub-pixels from the plurality of subpixels color filter array to form one or more logical pixels, wherein the image driver is configured to dynamically select a first plurality of sub-pixels to form a first optical pixel of a first frame of an image from at least one sub-pixel from a repeat cell and other sub-pixels from adjacent repeat cells and to select a second plurality of sub-pixels to form a second optical pixel of a second frame of an image from the at least one subpixel from the repeat cell and other sub-pixels from different repeat cells to the adjacent repeat cells; and wherein the first plurality of sub-pixels are selected to provide desired color, brightness, and saturation based on display attributes for the first frame.

2. The TIR display of claim 1, wherein at least two of the dynamically selected sub-pixels are not adjacent to each other in a same column or a same row.

3. The TIR display of claim 1, wherein the dynamically selected sub-pixels of a logical pixel are adjacent to each other in a same column or a same row.

4. The TIR display of claim 1, wherein the sub-pixels a repeat cell are selected to in response to at least one of frame attributes, ambient condition or user-selected attributes.

5. The TIR display of claim 1, wherein at least two of the sub-pixels in a repeat cell have different sizes.

6. The TIR display of claim 1, further comprising a mask disposed between two adjacent sub-pixels.

7. The TIR display of claim 1, wherein a first logical pixel and a second logical pixel share at least one sub-pixel.

8. The TIR display of claim 1, wherein a first logical pixel and a second logical pixel do not share a sub-pixel.

9. The TIR display of claim 1, wherein the display is driven using sub-pixel rendering.

10. A totally-internally reflective (TIR) display, comprising: a sub-pixel color filter array, each sub-pixel in the array further comprising a top electrode disposed over one or more convex protrusions, a bottom electrode separated from the top electrode to form a gap therebetween, a plurality of electrophoretic particles disposed in the gap, and a color filter, the convex protrusions configured to semi-retroreflect light; a processing circuitry; a memory circuitry in communication with the processing circuitry, the memory circuitry further comprises instructions to direct the processing circuitry to dynamically select a plurality of sub-pixels from the sub-pixel array to form a logical pixel; wherein the sub-pixels of the logical pixel are selected from a discontiguous group of sub-pixels, dynamically selecting the plurality of sub-pixels includes: selecting a first plurality of sub-pixels pixels to form a first optical pixel of a first frame of an image from at least one sub-pixel from a repeat cell and other sub-pixels from adjacent repeat cells; and selecting a second plurality of sub-pixels to form a second optical pixel of a second frame of an image from the at least one subpixel from the repeat cell and other sub-pixels from different repeat cells to the adjacent repeat cells; and wherein the first plurality of sub-pixels are selected to provide desired color, brightness, and saturation based on display attributes for the first frame.

11. The TIR display of claim 10, wherein the memory circuitry further comprises instructions to direct the processing circuitry to dynamically select one or more sub-pixels to form a logical pixel as a function of ambient conditions.

12. The TIR display of claim 10, wherein the memory circuitry further comprises instructions to direct the processing circuitry to dynamically select one or more sub-pixels to form a logical pixel as a function of an upcoming frame attributes.

13. The TIR display of claim 10, wherein the sub-pixels in the logical pixel have substantially the same size.

14. The TIR display of claim 10, wherein at least two of the sub-pixels in the logical pixel have different sizes.

15. The TIR display of claim 10, further comprising a mask disposed between two adjacent sub-pixels.

16. The TIR display of claim 10, wherein the display is driven using sub-pixel rendering.

17. At least one non-transitory machine-readable medium including instructions to display an image having a plurality of frames in a totally-internally reflective (TIR) display, comprising: identifying one or more display attributes for a first frame of an image to be displayed; dynamically selecting a first plurality of sub-pixels to form a first optical pixel of a first frame of an image from at least one sub-pixel from a repeat cell and other sub-pixels from adjacent repeat cells, dynamically select a second plurality of sub-pixels to form a second optical pixel of a second frame of an image from the at least one subpixel from the repeat cell and other sub-pixels from different repeat cells than the adjacent repeat cells; dynamically selecting a first plurality of sub-pixels from a sub-pixel color filter array to form a first logical pixel to provide desired color, brightness, and saturation associated with the one or more display attributes; and driving a plurality of electrophoretic particles from a first electrode to a second electrode to display the logical pixel of the first frame; wherein the first plurality of sub-pixels of the first logical pixel are selected from a discontiguous group of sub-pixels; wherein each sub-pixel of the array comprising a plurality of convex-protrusions positioned over a first surface of a transparent front sheet and configured to semi-retroreflect light.

18. The medium of claim 17, further comprising:
identifying one or more display attributes for a second frame to be displayed;
dynamically selecting a second plurality of sub-pixels from the sub-pixel array to form a second logical pixel; and
driving the plurality of electrophoretic particles between the first and the second electrodes to display the second logical pixel of the first frame.

19. The medium of claim 18, wherein the first logical pixel and the second logical pixel share at least one sub-pixel.

20. The medium of claim 18, wherein the first logical pixel and the second logical pixel comprise different sub-pixels.

21. The medium of claim 17, wherein the first logical pixel is substantially replicated throughout the sub-pixel array to display pixels of the first frame.

22. The medium of claim 17, wherein the sub-pixels in the first logical pixel have substantially the same size.

23. The medium of claim 17, wherein at least two of the sub-pixels in the first logical pixel have different sizes.

* * * * *